United States Patent
Raj et al.

(10) Patent No.: US 8,914,763 B1
(45) Date of Patent: Dec. 16, 2014

(54) METHODS, SYSTEMS, AND ARTICLES OF MANUFACTURE FOR GENERATING MULTI-LAYER LOCAL MAXIMAL ORTHOGONAL ROUTING PATHS IN FRACTURED SPACE

(71) Applicant: Cadence Design Systems, Inc., San Jose, CA (US)

(72) Inventors: Satish Raj, Saratoga, CA (US); Supriya Ananthram, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/692,970

(22) Filed: Dec. 3, 2012

(51) Int. Cl.
G06F 17/50 (2006.01)

(52) U.S. Cl.
CPC .................................. *G06F 17/5077* (2013.01)
USPC .............................. 716/132; 716/119; 716/139

(58) Field of Classification Search
USPC .......................................... 716/119, 132, 139
See application file for complete search history.

(56) References Cited

U.S. PATENT DOCUMENTS

| | | | | |
|---|---|---|---|---|
| 6,763,512 B2 * | 7/2004 | Xing | ............................. | 716/129 |
| 7,752,590 B1 * | 7/2010 | Chyan et al. | .................. | 716/122 |
| 8,464,196 B1 | 6/2013 | Lawson et al. | | |
| 8,560,998 B1 | 10/2013 | Salowe et al. | | |
| 8,671,368 B1 * | 3/2014 | Salowe et al. | .................. | 716/55 |

OTHER PUBLICATIONS

U.S. Appl. No. 12/980,744, filed Dec. 29, 2010.
U.S. Appl. No. 13/602,071, filed Aug. 31, 2012.
U.S. Appl. No. 13/602,069, filed Aug. 31, 2012.
U.S. Appl. No. 13/705,164, filed Dec. 4, 2012.
U.S. Appl. No. 13/719,058, filed Dec. 18, 2012.
Non-Final Office Action dated Mar. 11, 2014 for U.S. Appl. No. 13/693,011.
Notice of Allowance dated Aug. 4, 2014 for U.S. Appl. No. 13/693,011.

* cited by examiner

*Primary Examiner* — Thuan Do
(74) *Attorney, Agent, or Firm* — Vista IP Law Group, LLP

(57) ABSTRACT

Various embodiments identify a design including circuit features and identify an operation that produces an aggressor for victim(s). The operation on the aggressor and the set of victims are implemented using local maximally spanning spacetile(s) while satisfying some design requirements. Where the set of victims includes interconnects, the design may allow no bend in some interconnects. One or more spacetiles are used to perform the operation on the aggressor and implement the interconnects while introducing no bends in the interconnects by using local maximally spanning spacetile(s). Some implementation may perform block modeling for the aggressor to perform the operation on the aggressor and implement a set of victims while preserving the relative order of the interconnects by using the block modeling for the aggressor.

23 Claims, 20 Drawing Sheets

METHODS, SYSTEMS, AND ARTICLES OF MANUFACTURE FOR GENERATING MULTI-LAYER LOCAL MAXIMAL ORTHOGONAL ROUTING PATHS IN FRACTURED SPACE

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. The task of all routers is the same—routers are given some pre-existing polygons consisting of pins on cells and optionally some pre-routes from the placers to create geometries so that all pins assigned to different nets are connected by wires and vias, that all wires and vias assigned to different nets do not overlap, and that all design rules are obeyed. That is, a router fails when two pins on the same net that should be connected are open, when two pins on two different nets that should remain open are shorted, or when some design rules are violated during routing.

A layout file is created from the placement and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process.

In modern integrated circuits, complex routing rules have led some customers to use restrictive routing rules. For example, some foundries impose upon the circuit designers some routing rules that require certain interconnect segments or certain areas of an electronic circuit design are not allowed to have any bends. Nonetheless, a subsequent addition to or modification of an electronic circuit design may lead to a certain feature encroaching upon a space claimed by another circuit feature such as an interconnect segment and thus requires the latter to be modified, often resulting in multiple bends to free up the space encroached upon to accommodate the addition to or modification of the electronic circuit design. Another commonly seen requirement is the preservation of the relative order of a bundle of interconnects connected to, for example, a computer bus that transfers data among components of a computing system with parallel or bit serial connections.

Thus, there exists a need for a method, a system, and an article of manufacture for implementing multi-layer local maximal spanning routing paths. There also exist a need for a method, a system, and an article of manufacture for implementing multi-layer routing paths while preserving the relative order of the routing paths.

SUMMARY

Disclosed are method(s), system(s), and article(s) of manufacture for implementing multi-layer local maximal spanning interconnect segments in one or more embodiments. Various embodiments identify a portion of an electronic design that includes a set of circuit features (e.g., a bundle of interconnect segments) and identify an operation on the electronic circuit design that results in creating an aggressor circuit feature for the set of circuit features. These embodiments then implement the operation on the electronic circuit design and push or move the set of victim circuit features while satisfying one or more design constraints, design rules, or design requirements (hereinafter requirement or requirements, collectively.)

In some of these embodiments where the set of victim circuit features comprises a bundle of interconnect segments, the one or more requirements may allow no bend in the bundle of interconnect segments. In these embodiments, the method or system uses one or more spacetiles to implement the operation and the bundle of interconnect segments while introducing no bends in the bundle of interconnect segments. In some embodiments, the one or more requirements may include a requirement to preserve the relative order of the set of circuit features. These embodiments may further perform a block modeling process on the aggressor resulting from the operation on the electronic circuit design to implement the operation on the electronic circuit design and a set of one or more victim circuit features while satisfying the requirement of preserving the relative order among the set of one or more victim circuit features.

Disclosed are method(s), system(s), and article(s) of manufacture for generating multi-layer local maximal spanning interconnect segments. In one or more embodiments, the method may invoke a computing system to perform a process of identifying a region of interest. The method may further determine or identify a local, maximally spanning spacetile, and implement a first circuit feature by using at least the local, maximally spanning spacetile while satisfying one or more requirements. In some embodiments, the method for determining or identifying the local, maximally spanning spacetile may further perform a spacetile punch process for the region of interest to generate a plurality of spacetiles, identify a first set of one or more local, maximally spanning spacetiles, and identify the local, maximally spanning spacetile from the one or more local, maximally spanning spacetiles.

In some embodiments, the method that invokes a computing system to perform the spacetile punch process may further identify at least a first layer and a second layer in the electronic design that are related to the first circuit feature, identify or determine a spacetile canvas by aggregating a first plurality of spacetiles for the first layer with a second plurality of spacetiles for the second layer, and determine the plurality of spacetiles based at least in part upon a result of aggregating the first plurality of spacetiles for the first layer with a second plurality of spacetiles for the second layer. In some embodiments, the method that uses a computing system to determine or identify the local, maximally spanning spacetile may further use the computing system to discard at least one spacetile from the plurality of spacetiles to form a set of one or more remaining spacetiles or to perform one or both of a spacetile merging process and a spacetile partitioning process on at least a part of the set of one or more remaining spacetiles, wherein the spacetile merging process combines two or more spacetiles into a first single spacetile, and the spacetile partitioning process sub-divides a second single spacetile into multiple, smaller spacetiles.

In some embodiments, the method may further use a computing system to order or prioritize the one or more local, maximally spanning spacetiles, in which the act of ordering or prioritizing the one or more local, maximally spanning spacetiles is based at least in part upon proximity of the one or more local, maximally spanning spacetiles to an aggressor circuit feature. In some embodiments, the method that uses a computing system to order or prioritize the one or more local, maximally spanning spacetiles does so based at least in part upon proximity of the one or more local, maximally spanning spacetiles to a reference line or a reference point.

In some embodiments, the method may also uses a computing system to identify an operation on a second circuit feature as an aggressor circuit feature, wherein the operation comprises an addition or a modification of a second circuit feature in the electronic design, and to identify one or more circuit features that are negatively affected by the operation on the second circuit feature as one or more victim circuit features, wherein the one or more victim circuit features include the first circuit feature, and the region of interest is identified based at least in part upon the one or more victim circuit features or the aggressor circuit feature. In some of these embodiments, the one or more requirements comprise a first requirement that allows no bends in the first circuit feature.

In some embodiments, the region of interest comprises a dynamic region that changes with a performance of the operation or with a specific victim circuit feature that is being implemented by using the local, maximally spanning spacetile or another local, maximally spanning spacetile. In some embodiments, the method may further use a computing system to implement a third circuit feature by using at least the local, maximally spanning spacetile or another local, maximally spanning spacetile while satisfying the one or more requirements, to revise the region of interest based at least upon the third circuit feature, or to determine whether the local, maximally spanning spacetile or the another local, maximally spanning spacetile is to be used to implement the third circuit feature.

In some of these embodiments where it is determined that the another local, maximally spanning spacetile is to be used to implement the third circuit feature, the method may use a computing system to perform a spacetile punch process with respect to the region of interest that has been revised, to identify a second set of one or more local, maximally spanning spacetiles from the spacetile punch process, and to identify the another local, maximally spanning spacetile from the second set of one or more local, maximally spanning spacetiles.

Disclosed further are method(s), system(s), and article(s) of manufacture for implementing multi-layer local maximal spanning routing paths in an electronic design while preserving relative order. In some embodiments, the method may use a computing system to identify an aggressor circuit feature, to perform block modeling for the aggressor circuit feature based at least in part upon a set of one or more victim circuit features, to identify a local, maximally spanning spacetile based at least in part upon a region of interest, and to implementing at least the set of victim circuit features using at least the local, maximally spanning spacetile. In some of these embodiments, the method may further use the computing system to identify a characteristic associated with an operation that is to be performed on the aggressor and to identify a requirement of preserving relative order of the set of victim circuit features, wherein the set of victim circuit features is implemented using at least the local, maximally spanning spacetile to satisfy the requirement.

In some embodiments, the characteristic comprises a direction associated with an operation that is to be performed on the aggressor circuit feature. In some of these embodiments, the method may further use the computing system to identify available space in the region of interest based at least in part upon the set of one or more victim circuit features and to determine whether or not the available space is sufficient to implement the set of one or more victim circuit features. In some of these embodiments, the method may further use the computing system to identify a first dimension for a block model of the aggressor circuit feature based at least in part upon at least one victim circuit feature in the set of one or more victim circuit features, to identify a second dimension for the block model of the aggressor circuit feature based at least in part upon the characteristic associated with the operation, and to perform the block modeling for the aggressor circuit feature by using at least the first dimension and the second dimension for the block model.

In some embodiments, the act of identifying the second dimension for the block model is further based at least in part upon a relative orientation of the set of one or more victim circuit features and the aggressor circuit feature. In some embodiments, the first dimension for the block model of the aggressor circuit feature is equal to or greater than at least a first victim dimension of a first victim circuit feature in the set of one or more victim circuit features. In some embodiments, the first dimension for the block model of the aggressor circuit feature is equal to or greater than at least a first victim dimension of a first victim circuit feature in the set of one or more victim circuit features plus at least a size of a via connected to the first victim circuit feature.

In some embodiments where the method uses a computing system to identify a local, maximally spanning spacetile, the method may further use the computing system to perform a spacetile punch process with respect to the region of interest to generate multiple spacetiles based at least in part upon a portion of the set of one or more victim circuit features and to identify one or more local, maximally spanning spacetiles from the multiple spacetiles. In some of these embodiments, the method that uses a computing system to identify the local, maximally spanning spacetile may further use the computing system to order or prioritize the one or more local, maximally spanning spacetiles and to identify the local, maximally spanning spacetile based at least in part upon a result of ordering or prioritizing the one or more local, maximally spanning spacetiles.

In some embodiments where the method uses a computing system to identify the local, maximally spanning spacetile may further use the computing system to discard at least one spacetile from the multiple spacetiles to for a set of one or more remaining spacetiles and to identify the local, maximally spanning spacetile from the set of one or more remaining spacetiles. In some embodiments, the first dimension for the block model of the aggressor circuit feature is equal to or greater than at least a first victim dimension of a first victim circuit feature in the set of one or more victim circuit features plus at least a size of a via connected to the first victim circuit feature. In some embodiments where the method uses a computing system to identify a local, maximally spanning spacetile may also use the computing system to perform a spacetile punch process with respect to the region of interest to generate multiple spacetiles based at least in part upon a portion of the set of one or more victim circuit features and to identify one or more local, maximally spanning spacetiles from the multiple spacetiles.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to a methods, systems, and articles of manufacture for implementing multi-layer local maximal routing paths. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for implementing multi-layer local maximal routing paths in one or more embodiments. Various embodiments identify a portion of an electronic design that includes a set of circuit features (e.g., a bundle of interconnect segments) and identify an addition or modification to the electronic design that results in producing an aggressor for the set of circuit features. These embodiments then implement the addition or modification and push or move the set of circuit features while satisfying one or more design requirements. In some of these embodiments where the set of victim circuit features comprises a bundle of interconnect segments, the one or more requirements include a requirement that allows no bend in the bundle of interconnect segments.

In these embodiments, the method or system uses one or more spacetiles to implement the addition or modification and the bundle of interconnect segments while introducing no bends in the bundle of interconnect segments. In some embodiments, the one or more requirements include a requirement to preserve the relative order of the set of circuit features. In these embodiments, the method or system further includes a block modeling process or module to model the aggressor resulting from the addition or modification of the aggressor to implement the addition or modification of the aggressor and a set of one or more victims while satisfying the requirement of preserving the relative order. Various details of any of the processes, sub-processes, or acts are further provided below with reference to respective drawing figures.

Figure 1:
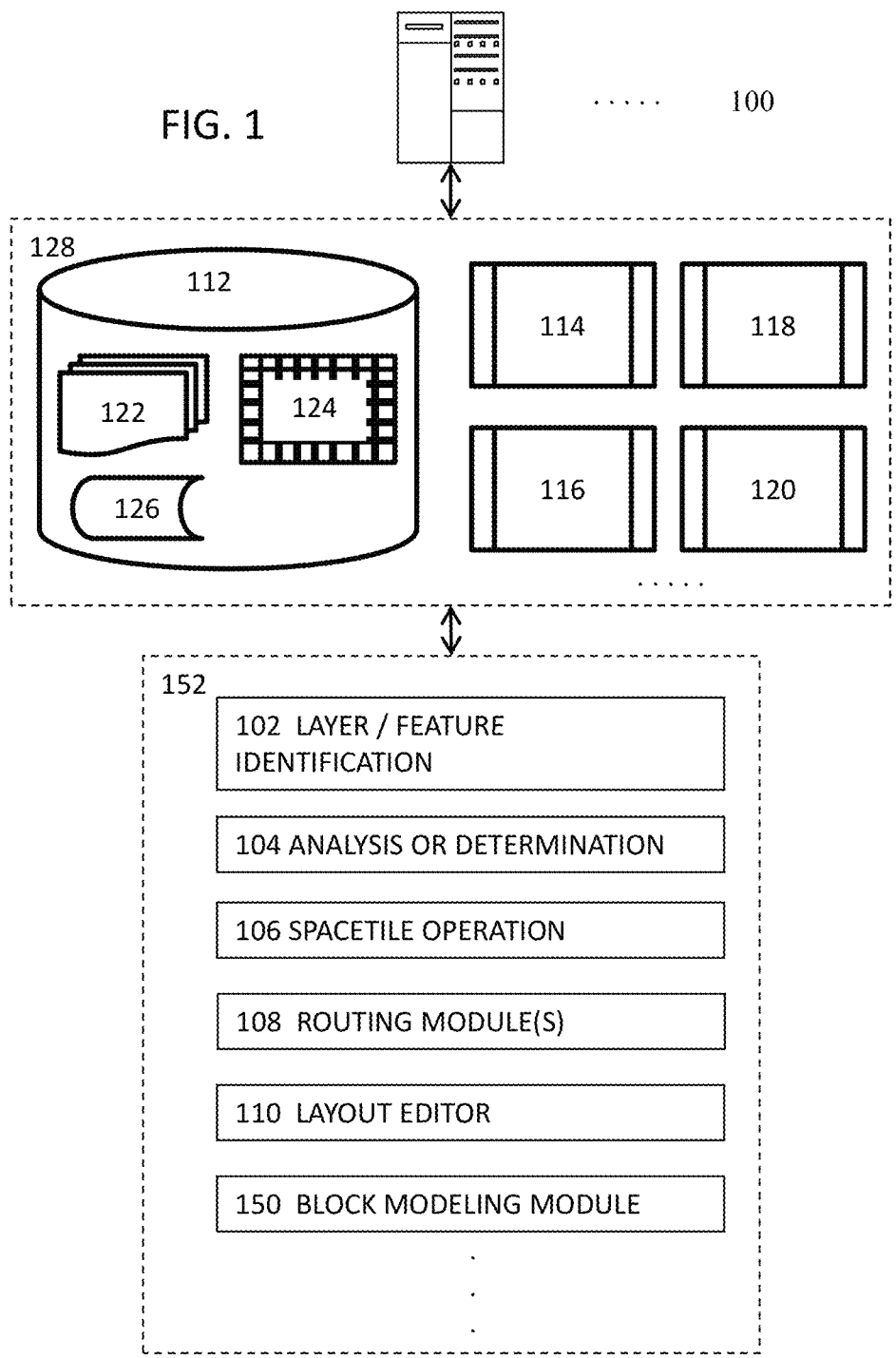
FIG. 1 illustrates a high level block diagram for a system for implementing multi-layer local maximal routing paths in some embodiments.

FIG. 1 illustrates a high level block diagram for a method or a system for generating multi-layer local maximally spanning routing paths in a fractured space in some embodiments. In one or more embodiments, the system for generating multi-layer local maximally spanning routing paths in a fractured space may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises a routing layer or layout feature identification module 102 to identify one or more features or one or more layers, an analysis or determination module 104 to make various determinations, a spacetile operation module 106 to process any tasks involving spacetiles or spacetile layers either alone or jointly with one or more other modules, one or more routing modules 108 such as a global router or a detail router, a layout or physical design editor 110, a block modeling module 150, etc. In some embodiments, the one or more features of the first routing layer comprises a soft or hard track, a blockage, a via, an existing circuit component, a spacetile, or an area probe, or a combination thereof associated with the first routing layer. In some embodiments, the layer or feature identification module identifies one or more layers, such as metal 1 and metal 2, as well as a via layer therebetween, that are relevant to implementation of one or more interconnects from an electronic design. The identification of such one or more layers that are relevant to implementation of one or more interconnects will be described in greater details in subsequent paragraphs.

Figure 2:
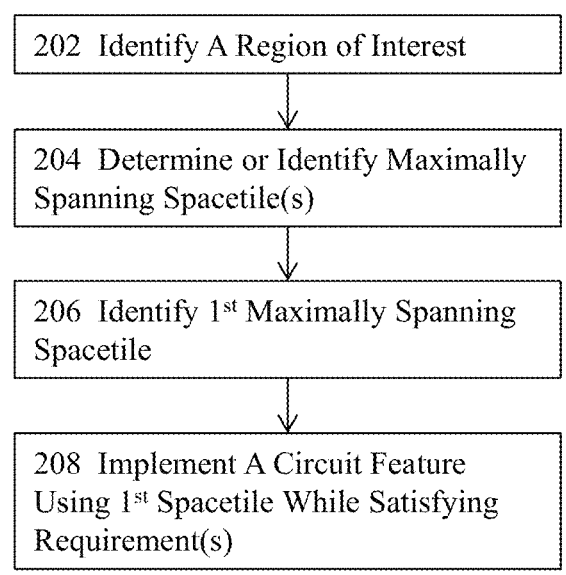
FIG. 2 illustrates a top level flow diagram for implementing multi-layer local maximal routing paths in some embodiments.

FIG. 2 illustrates a top level flow diagram for implementing multi-layer local maximal routing paths in some embodiments. In one or more embodiments, the method for implementing multi-layer local maximal routing paths comprises the process 202 of identifying a region of interest. The region of interest will be described in greater details in subsequent paragraphs. In these embodiments, the method may further comprise the process 204 for identifying or determining one or more local, maximally spanning spacetiles based at least in part upon the region of interest identified at 202. Once the one or more local, maximally spanning spacetiles are identified or determined, the method may further comprise the process 206 of identifying the first local, maximally spanning spacetile from the one or more local, local, maximally spanning spacetiles identified or determined at 204. In some of these embodiments, the method may identify the first local, maximally spanning spacetile based on an order among the one or more local, maximally spanning spacetiles.

At 208, the method for implementing multi-layer local maximal routing paths may further comprise the process of implementing an interconnect segment by using the first local, maximally spanning spacetile. In some of these embodiments, the process, when performed by a computing system such as the computing system 100 in FIG. 1, may implement the interconnect segment while satisfying one or more requirements. Such one or more requirements may include, for example but not limited to, one or more spacing rules, one or more requirements that allow no bend in the interconnect or in a portion of an electronic circuit design, one or more requirements that require certain spacing values be maintained, one or more requirements that impose some parallel run-length spacing rule(s), or any other design constraints, rules, requirements, or combination(s) thereof. The terms "spacetile", "local, maximally spanning spacetile" will also be described in greater details in subsequent sections with reference to specific figure(s).

Figure 3:
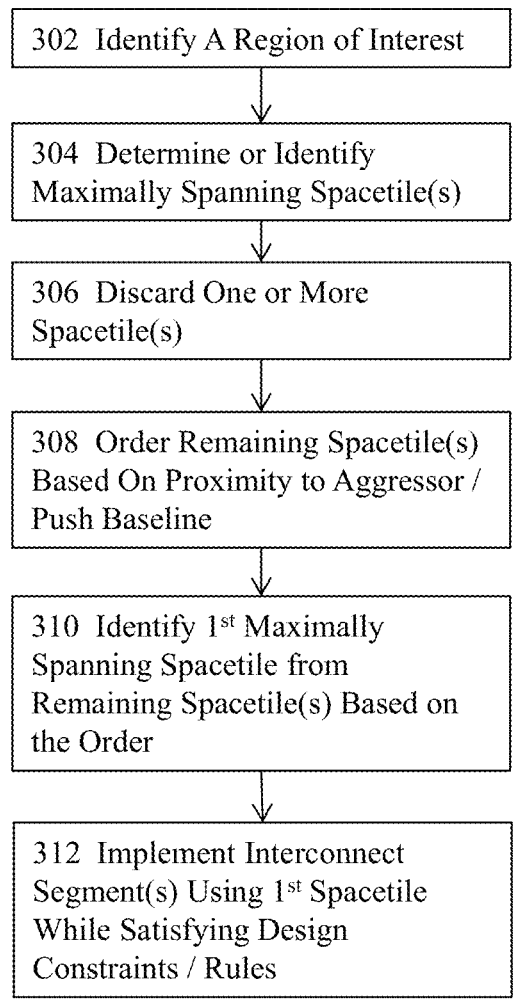
FIG. 3 illustrates a more detailed flow diagram for multi-layer local maximal routing paths in some embodiments.

FIG. 3 illustrates a more detailed flow diagram for implementing multi-layer local maximal routing paths in some embodiments. In one or more embodiments, the method for implementing multi-layer local maximal routing paths may comprise the process 302 for identifying a region of interest and the process 304 for identifying or determining one or more local, maximally spanning spacetiles in a portion of an electronic design having an aggressor and a bundle of interconnect segments based at least in part upon the region of interest identified at 302. In various embodiments, a spacetile comprises a zero-, one-, or two-dimensional geometric entity in the routing space within, along, or at which the centerline of an interconnect or a center of a circuit feature (e.g., a via) may lie.

A spacetile may be used as an area probe by the method or system to search for viable routing solutions. Regardless of the dimensionality of a spacetile, a space tile is considered an area probe, whereas the zero- and one-dimensional spacetiles are considered degenerated area probes. It shall be noted that the term "maximally spanning spacetile" refers to a spacetile that spans maximally with respect to a local region, e.g., the region of interest in some embodiments. Therefore, a maximally spanning spacetile does not refer to a spacetile that spans maximally in a global sense and hence the term local, maximally spanning spacetile. The local, maximally spanning spacetile will be described in greater details in subsequent sections with reference to appropriate figure(s).

In some embodiments, an aggressor or an instigator comprises a segment of an interconnect or a circuit feature that is placed, added, or changed in the portion of the electronic circuit design in such a way that encroaches upon a space that is claimed by another circuit feature (e.g., another interconnect segment or another circuit feature). A space that is claimed by a circuit feature may comprise, for example but not limited to, the space in the electronic circuit design that is occupied by the circuit feature in some embodiments. A space that is claimed by a circuit feature may comprise, as another example, the space in the electronic circuit that is not necessarily occupied by the circuit feature but nonetheless needs to be maintained in a way that no other circuit features are permitted to encroach upon.

For example, the space claimed by a rectangular shape (e.g., a terminal) may comprise the space that is occupied by the rectangular shape in the electronic circuit design in some embodiments or the space that is occupied by the rectangular shape plus the surrounding area that needs to be maintained for proper spacing. In some embodiments, the method may further comprise the process 306 for discarding one or more spacetiles from the one or more spacetiles identified at 302. The one or more spacetiles that are discarded will not be used in implementing a segment of a route in some embodiments. Therefore, the method performs the process 306 to identify such one or more spacetiles that will not be used in implementing a segment of a route in these embodiments.

At 308, the method may further perform a process to order the remainder of the one or more spacetiles after some of the spacetiles are discarded at 306 in some embodiments. In some embodiments, the remainder of the one or more spacetiles is ordered based at least in part upon the proximity of a spacetile to an aggressor. For example, the spacetile that is closest to the aggressor may assume the highest order among the remainder of the one or more spacetiles. In some embodiments where there are multiple spacetiles having the same proximity to the aggressor, these multiple spacetiles may be ordered based at least further in part upon the addition or modification of the aggressor. An addition or modification of the aggressor may include adding the aggressor into the electronic circuit design or modifying an existing circuit feature in the electronic circuit design that turns the circuit feature into an aggressor.

For example, if the aggressor is to be added, moved or pushed, or lengthened in the upward direction in a layout, and if the first spacetile and the second spacetile are at the same proximity to the aggressor, the spacetile that is in the direction of the addition or modification of the aggressor will assume the highest order. In some embodiments, the remainder of the one or more spacetiles may be ordered based on their respective proximity to an established reference line or reference point. The reference line or the reference point will be described in greater details in subsequent sections with reference to the appropriate figures. In some embodiments, the method may further comprise the process 310 to identify a first maximally spanning spacetile from the remainder of the one or more spacetiles based at least on the order determined at 308.

In some embodiments where the local maximally spanning spacetile that is within the closest proximity to the aggressor is determined to have the highest order, the method identifies such a maximally spanning spacetile at 308. At 312, the method for implementing multi-layer local maximal routing paths may further comprise the process of implementing the bundle of interconnect segments using the first local, maximally spanning spacetile while satisfying one or more requirements. The one or more requirements may include, for example but not limited to, one or more hard or soft spacing rules, one or more complex design rules, one or more requirements that prohibit having any bends in the bundle of interconnect segments, one or more requirements that preserve the relative order of the bundle of interconnect segments with respect to, for example, the corresponding terminals or corresponding pads, a combination thereof, design intent, or any other design rules, constraints, or requirements.

Figure 4:
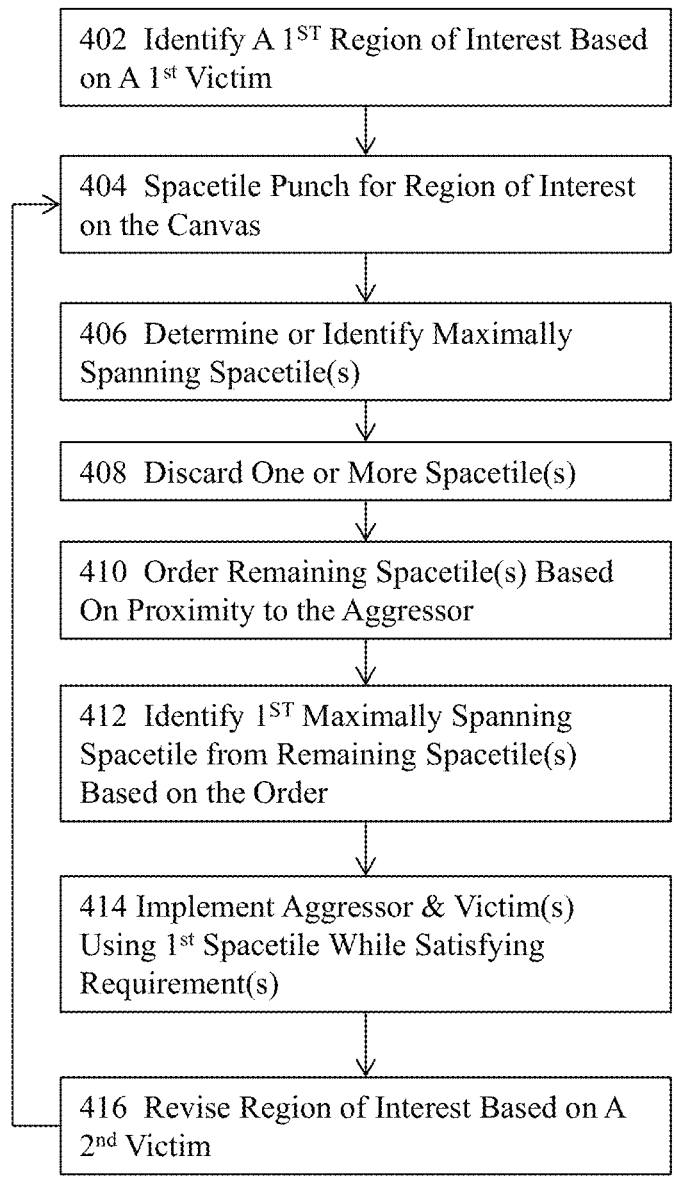
FIG. 4 illustrates a more detailed flow diagram for implementing multi-layer local maximal routing paths in some embodiments.

FIG. 4 illustrates a more detailed flow diagram for implementing multi-layer local maximal routing paths in some embodiments. In one or more embodiments, the method for implementing multi-layer local maximal routing paths may comprise the process 402 of identifying a first region of interest based on a first victim of a bundle of one or more circuit features. A circuit feature may include, for example but not limited to, an interconnect segment, a circuit component, a block of circuit components, etc. A bundle of one or more circuit features may include, for example but not limited to, an interconnect segment, a circuit component, a block of circuit components, or a combination thereof. A victim comprises a circuit feature that is affected by an intended addition or modification of the electronic circuit design that results in turning a circuit feature into an aggressor. An aggressor is a circuit feature whose existence negatively affects at least another circuit feature in the electronic design.

At 404, the method may further include the process of performing spacetile punch in a canvas with respect to the region of interest. A canvas includes multiple layers in the electronic circuit design that may be affected by the aggressor. In some embodiments, the spacetile punch identifies usable routing space in the routing area and subdivides the routing space into one or more spacetiles. The spacetile punch subdivides the routing space according to at least one or more design rules (e.g., one or more spacing rules or one or more width rules for interconnects, etc.) into one or more spacetiles. It shall be noted that the recitation of "a spacetile punch" does not necessarily a single spacetile punch. Rather, the recitation of "a spacetile punch" refers to the performance of the spacetile punch process, which is explained in greater details below, and thus may include one or more "spacetile punches".

A spacetile comprises an n-dimensional geometric entity in the routing space in some embodiments. The method may then identify a spacetile as an area probe to guide a router (e.g., a point-to-point router that routes an interconnect between two points in the design) to perform area search for routing an electronic design. An area probe may be used to store information such as the information about the spacetile itself, various information about routing the interconnect (e.g., destination location, beginning location, etc.) in some embodiments. In some embodiments, the method may further mark or label the spacetiles.

For example, if a circuit feature is added or modified in the electronic design in a way that the added or modified circuit feature encroaches upon an impermissible area of a victim of a first layer, the victim may have to be moved, re-placed, or re-routed in the first layer of the electronic circuit design. Nonetheless, the victim may also be connected to another circuit feature on a second layer (e.g., on another metal layer) through, for example, a via. In this example, the canvas includes at least the first layer, the second layer, and the via layer in which the via is modeled for the purpose of spacetile. A spacetile punch is described in more details in some of the subsequent paragraphs with reference to FIGS. 4A-D.

In some embodiments, the method may further include the process 406 of determining or identifying one or more local maximally spanning spacetiles from the spacetile(s) generated by the spacetile punch at 404. In some embodiments where, a local maximally spanning spacetile comprises a spacetile whose length covers at least the entire length of the victim. In some embodiments, a spacetile whose length is equal to that of the victim may be considered as a local maximally spanning spacetile. In some embodiments, a spacetile whose length is equal to that of the victim plus two times the half width or the radius of the via or two times the half width of a terminal or pad (depending upon how and whether the victim is connected) may be considered as a local maximally spanning spacetile. In some embodiments, a spacetile whose length is equal to the length of the victim plus two times the half width or the radius of the via or two times the half width of a terminal or pad (depending upon how and whether the victim is connected) plus two times of the spacing requirement(s) may be considered as a local maximally spanning spacetile.

In various embodiments, although a spacetile may a zero-, one-, or two-dimensional spacetile, a local maximally spanning spacetile is a one- or two-dimensional spacetile because the local maximally spanning spacetile may be selected or identified by the method to implement an interconnect segment. For example, if a modification or addition of an aggressor (e.g., a first interconnect segment) is encroaching upon the space claimed by a victim circuit feature (e.g., an second interconnect segment) in a first direction (e.g., a preferred routing direction for the layer in which the aggressor is located), the length of the local maximally spanning spacetile covers at least the length of the second interconnect segment along the second direction (e.g., the non-preferred routing direction).

In some embodiments where the Manhattan grid is used, if the aggressor (e.g., a first interconnect segment) is to be lengthened along the vertical routing direction such that the post-modification aggressor encroaches upon the space claimed by a victim (e.g., a second interconnect segment), a local maximally spanning spacetile is a spacetile whose length in the horizontal direction covers at least the length of the second interconnect segment in the horizontal direction. It shall be noted that although the Manhattan grid is used in the above example, various embodiments described herein shall not be limited to orthogonal directions, and that various embodiments also apply with full and equal effects to electronic circuit designs with oblique interconnects (e.g., 45-degree or 135-degree route segments). It shall also be noted that although the Manhattan grid is used in the above example, various embodiments described herein shall not be limited to gridded electronic circuit designs because the Manhattan grid is used in the above example to provide reference to directions for describing the relationships between an aggressor and the region of interest or the spacetile, and that various embodiments also apply with full and equal effects to gridded and gridless as well as tracked and trackless electronic circuit designs.

In some embodiments, the identified layer may comprise tracks. A track may comprise a line of zero thickness on which the centerline of an interconnect lies. In some embodiments where a preferred or default routing direction is defined, a track along the preferred or default routing direction is called a right-way track. A track that does not lie along the preferred or default routing direction is called a wrong-way track in these embodiments.

It shall be noted that the aforementioned definitions of right-way tracks and wrong-way tracks are not limited to Manhattan routing directions that are perpendicular to each other and may also applied to two routing directions at an oblique angle for a given layer. In some embodiments where a layer is associated with some tracks, the layer may be deemed "tracked" or "track-based", which are used interchangeably in this application. A layer will be deemed trackless or not track-based if the layer is not associated with any tracks (e.g., no right-way tracks and wrong-way tracks.)

In some embodiments where a layer is associated with both the right-way tracks and the wrong-way tracks, the layer may be deemed as gridded or grid-based. In these embodiments, a grid is defined by the intersection of a right-way track and a wrong-way track. If a layer is associated with only one set of tracks (e.g., right-way tracks) but not the other (e.g., wrong-way tracks), the layer may be deemed gridless or not grid-based. Therefore, a gridded layer is always tracked because a gridded layer requires the tracks in the preferred or default routing direction (e.g., right-way tracks) and in the other direction (e.g., wrong-way tracks) to determine the grids, which are the intersections of the two sets of tracks. On the other hand, a gridless layer may be tracked or trackless because a gridless layer may contain only one set of tracks (e.g., the right-way tracks) or no tracks at all. In some embodiments where a gridless layer contains only one set of tracks, the layer is nonetheless tracked or track based. In some other embodiments where a gridless layer contains no tracks at all in either direction, the gridless layer is also trackless.

It shall be noted that various embodiments disclosed herein apply with full and equal effects to any tracked or trackless layer and also to any gridded or gridless layer. If shall also be noted that various embodiments disclosed herein apply with equal effect to a layer which may include tracks (right-way tracks or both right-way and wrong-way tracks) in a smaller portion of the layer whereas the remainder of the layer is trackless. If shall also be noted that various embodiments disclosed herein apply with equal effect to a layer which may be gridded in a smaller portion of the layer whereas the remainder of the layer is gridless or even trackless.

On the other hand, a trackless layer is always gridless because there exist no tracks at all on the layer to form grids. If shall also be noted that various embodiments disclosed herein apply with equal effect to a layer which may include non-uniform tracks or non-uniform grids in some embodiments. These embodiments do not require uniform tracks or uniform grids for achieving the all the intended purposes. Some embodiments further distinguish between a soft track and a hard track. A hard track is enforced by one or more design rules that require an interconnect to stay on a track and prohibit any off-track interconnects. A soft track may be enforced by one or more design rules that require an interconnect to stay on a track to the extent possible and may allow some off-track interconnects if the on-track requirements cannot be successfully enforced without increasing, for example, the cost, difficulty, etc. beyond some permissible thresholds or without causing other violations of, for example, one or more design rules.

It shall also be noted that the grids described herein refer to the routing grids, which are formed by electronic design automation (EDA) tools while routing an electronic design. A place and route tool may then place and route among the routing grids, which may be defined by the EDA tools, the circuit designers, or the design rules. A placement tool may also define or use placement grids, which may be determined to be multiples of the size of the manufacturing grids, to align cells, macros, blocks, etc. in the design. Manufacturing grids are defined by the foundries that reference the manufacturing grids, for example, for mask design and manufacturing to fabricate the electronic circuits according to their designs. Manufacturing grids are process specific because these grids usually represent the resolution threshold for specific manufacturing processes and are usually specified in technology files or a file that includes a specification for representing the physical layout of an electronic circuit (e.g., an LEF (library exchange format) file.) A typical manufacturing grid for 0.18 micron technology nodes is 5 nanometers. In other words, manufacturing grids exist because these grids are imposed by the foundries, and manufacturing grids are usually uniform. Unless otherwise expressly specified, a grid or grids refer to a routing grid or routing grids in this application. Nonetheless, it shall be noted that some embodiments may leverage the existing of the manufacturing grids to achieve various intended purposes because such manufacturing grids are imposed by the foundries.

In some embodiments, the method may comprise the process 408 of discarding one or more spacetiles. In some embodiments where it is required that the victim (e.g., an interconnect segment) have no bends after the modification of the aggressor is implemented, the one or more spacetiles that are discarded comprise the spacetiles whose lengths do not cover at least the length of the victim because these spacetiles cannot be used to implement (either by pushing, moving, or re-routing) the victim interconnect segment that includes no bends to satisfy the requirement. The method may further optionally comprise the process 410 of ordering the remaining spacetile(s). In some embodiments, a computing system, such as the computing system 100 in FIG. 1 or the computing system 1800 in FIG. 18 may perform the process 410 to order or prioritize the remaining spacetiles (if more than one spacetile remains in the design after the process 408 is performed) according to the remaining spacetiles' proximity to the aggressor, whereby the spacetile that is closest to the aggressor is assigned the highest order or priority.

It shall be noted that the order or priority among the remaining spacetiles need not be assigned numeric values but may also be expressed symbolically or textually. In some embodiments, the method may further comprise the process 412 of identifying a first local, maximally spanning spacetile from the remaining spacetiles. In some of these embodiments, the method may identify the spacetile with the highest order or priority as the first local, maximally spanning spacetile from the remaining spacetiles. In some embodiments, the method may not necessarily identify the spacetile with the highest order or priority as the first local, maximally spanning spacetile. Rather, the method may further determines how many victims are to be affected by the modification or addition of the aggressor and identifies the remaining spacetile that allows sufficient space to implement all the affected victims to implement the first victim while accounting for one or more requirements in some embodiments.

For example, if the method determines that the addition or modification of the aggressor may affect five victim circuit features that are also to satisfy one or more requirements (e.g., the spacing requirement(s), the requirement to maintain relative order among the victim circuit features, the requirement that allows for no bends in the five victim circuit features, or other requirements such as costs, timing, electrical performances, etc.), the method may identify the remaining spacetile which, when used by the method to implement one of the five victim circuit features, provides a satisfactory or viable solution to accommodate all five victim circuit features and to satisfy the one or more requirements. In some embodiments, the method may also comprise the process 414 to implement the addition or modification of the aggressor and the victim. At 416, the method further determines whether there exists other victims that are also affected by the addition or modification of the aggressor and revise the region of interest based at least in part upon the identification of a second victim circuit feature and loops back to 404 to repeat the processes as described above.

Figures 4A, 4B:
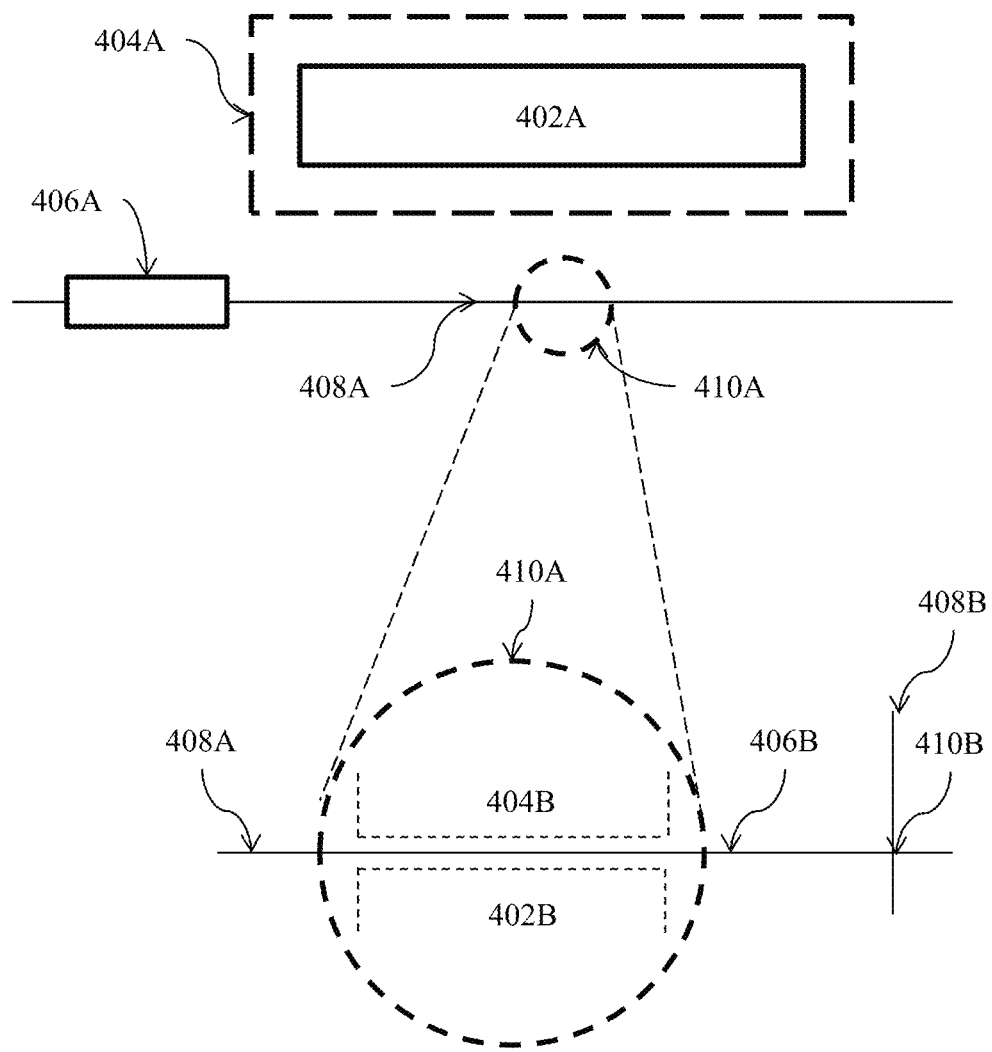
FIG. 4A illustrates an exemplary spacetile punch in some embodiments.
FIG. 4B illustrates more details of the exemplary spacetile punch of FIG. 4A in some embodiments.

FIG. 4A illustrates an exemplary spacetile punch in some embodiments. More specifically, FIG. 4A illustrates a first circuit component 402A (e.g., a cell or a blockage), a second circuit component (e.g., a pin) 406A, and a track 408A. The method or system may perform a spacetile punch for the track 408A, the first circuit component 402A, and the second circuit component 406A in some embodiments. More details for the spacetile punch for a pin will be described in greater details in subsequent paragraphs. In some embodiments, the method or system may identify one or more design rules, constraints, or requirements for the first circuit component 402A and perform a spacetile punch to punch out the space enclosed by the rectangular shape 404A. For example, the method or system may identify a first spacing rule along the longer side of the first component 402A and a second spacing rule along the shorter side of the first component 402A.

The method and the system may further identify permissible wire width(s) for an interconnect and then punch out the space enclosed by 404A. The length (the size of the longer side of 404A) may be determined to be the length of 402A (the size of the longer side of 402A) plus twice the sum of the first spacing requirement and half of the wire width due to the presence of the second circuit component 406A.

It shall be noted that this does not necessarily imply that the width (the size of the shorter side of 404A) is to be the width of 402A (shorter side of 402A) plus twice the amount of the sum of the second spacing requirement and half of the wire width unless the spacing requirement between the shorter side of 402A and an adjacent wire or circuit component remains identical to the second spacing requirement. In some embodiments, where the spacing requirements depend upon the parallel run length between two circuit components, the spacing requirement for the shorter side of 402A is more likely different from the second spacing requirement for the longer side of 402A due to the longer parallel run length between 402A and, for example, 406A. In these embodiments, 404A may be a quadrilateral but not a rectangle. Nonetheless, 404A is illustrated as a rectangle in FIG. 4A for the sole purpose of illustration and explanations.

In some embodiments, the spacing requirement may also vary with the parallel run length of the interconnect wire, and the area defined by 404A is thus a trapezoidal shape, rather than a rectangular shape. In some embodiments, the spacing requirement may be identical on all sides of the first component 402A and thus the punched out space as defined by 404A may be regarded as a uniform offset of the boundary of the first circuit component 402A. In some embodiments, the method or system, after performing the spacetile punch for 402A, may identify a single spacetile that includes the entire routing space under consideration and excludes the space defined by 404A.

The method or system may further perform a spacetile punch for the track 408A. The details of the spacetile punch are provided below with reference to FIG. 4B. FIG. 4B illustrates the same track 408A, against which the method or system performs the spacetile punch. The method or system may perform the spacetile punch and subdivide the routing space into three spacetiles—the spacetile 406B representing a one-dimensional degenerated area with zero thickness, the spacetile 402B representing the space below the degenerated area 406B, and the spacetile 404B representing the space below the degenerated area 406B.

FIG. 4B illustrates a close-up view of 410A of FIG. 4A. It shall be noted that although the spacetile 404B and 402B are illustrated to be of some distance from the degenerated spacetile 406B, spacetile 406B in fact represents and comprises a one-dimensional, degenerated area (rather than a conventional two-dimensional area as 402B and 404B). Also, the two vertical, dashed lines for each of 402B and 404B are shown to indicate that the spacetile 402B and spacetile 404B are two-dimensional areas, and these vertical, dashed lines do not represent the actual boundaries of the spacetiles 402B and 404B. In this example, the method or system further subdivides the single spacetile after performing the spacetile punch for the first circuit component 402A into three spacetiles—one one-dimensional spacetile and two two-dimensional spacetiles.

The method or system may then use any spacetiles as area probes. Similarly, the method may perform a spacetile punch to further identify more spacetiles for a vertical track 408B. For example, the method or system may further identify a two-dimensional spacetile to the right of 408B, a two-dimensional spacetile to the left of 408B, the one-dimensional, degenerated spacetile along 408B, and a zero-dimensional, degenerated spacetile 410B that represents the intersection of the horizontal track 408A and the vertical track 408B. This example illustrates that the method or the system may then use the spacetiles to perform area search to determine how to route an electronic design by identifying one or more area probes from the spacetiles and further by using the one or more area probes for determining the route, and that a spacetile may comprise an object associated with a two-dimensional geometric space or a degenerated zero- or one-dimensional geometric entity.

Figure 4C:
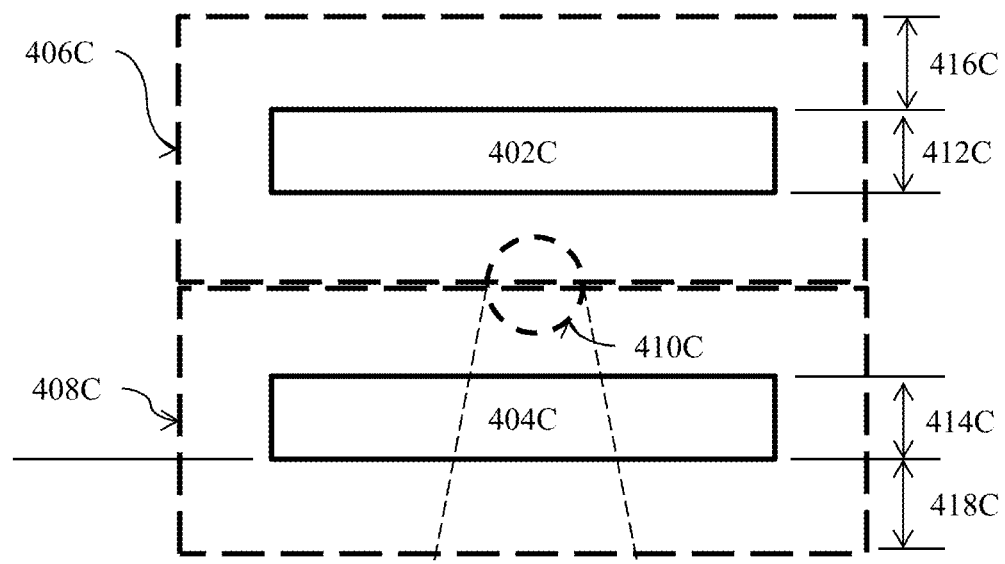
FIG. 4C illustrates another exemplary spacetile punch that generates a degenerated area probe that may be used for area search in routing an electronic design in some embodiments.
Figure 4D:
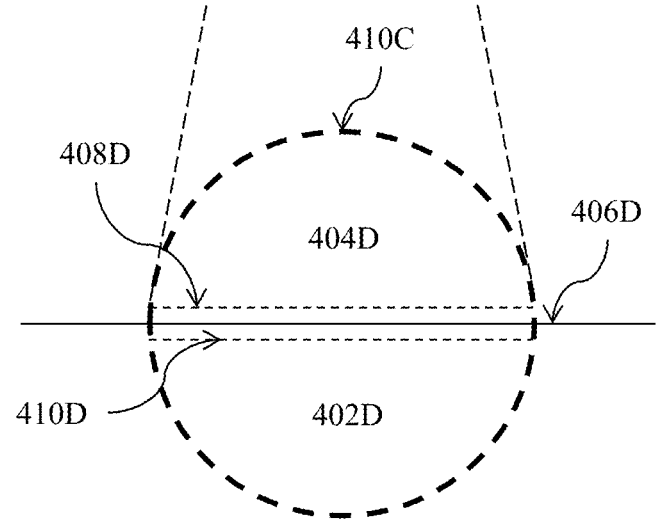
FIG. 4D illustrates more details about the spacetile punch illustrated in FIG. 4A in some embodiments.

FIG. 4C illustrates another exemplary spacetile punch that generates a degenerated area probe that may be used for area search in routing an electronic design in some embodiments. More specifically, FIG. 4C illustrates that the natural formation of a degenerated spacetile in some specific embodiments. FIG. 4C shows a routing space with the first component 402C with a first width 412C and a second component 404C with a second width 414c. The method or system may perform a spacetile punch for 402C and 404C respectively and punch out the space enclosed by 406 C and 408 C from usable routing space in a substantially similar manner as that described with reference to FIGS. 4A-B. If the placement tool determines the spacing between 402C and 404C in such a way (e.g., to minimize the use of real estate while satisfying all design rules) that the bottom of the space 406C coincides with the top of the space 408C, a viable spacetile may be determined as illustrated in FIG. 4D. For example, the distance 416C for the spacetile punch for 402C may be determined to be ((spacing between 402C and 404C)+½×width of wire) for the first component 402C. Similarly, the distance 418C for the spacetile punch for 404C may be determined to be ((spacing between 402C and 404C)+½×width of wire) for the second component 404C. In some embodiments where a via location is to be determined, the distance for the spacetile punch may be determined to be ((spacing requirement for a via)+½× width of via) rather than (½×width of wire).

It shall be noted that the spacing requirement may be imposed as a soft or a hard design rule in some embodiments, where a hard design rule must be followed, and the soft design rule is preferably followed unless or until no satisfactory placement or routing solution cannot be obtained. As a result, the spacing requirement may comprise as simple as a single numeric value or a multi-valued requirement or rule (e.g., maintain the minimum spacing of x1-nm between interconnects unless no solution can be obtained & maintain the minimum spacing of x2-nm between interconnects when no solution can be obtained with the minimum spacing of x1-nm). In some embodiments where complex spacing rules are required or desired, the spacing requirement may comprise, for example, a polynomial function of one or more variables.

For example, there may exist one or more design rules that require the minimum spacing between interconnects to be a polynomial function (e.g., a linear or a higher-order function) of the parallel run-length between the two interconnects. The method or system may use the same methodology to determine the distance for the spacetile punch accordingly to accommodate various types of requirements, constraints, or design rules. As a result, the geometric shapes of the space as indicated by 406C and 408C may not necessarily be rectangles as illustrated in FIG. 4C, which is provided for the ease of illustration and explanation. Rather, the geometric shapes of 406C and 408C are determined based at least in part upon the shapes involved (e.g., 402C or 404C), the width of the interconnect to be determined, or the length of the interconnect to be determined.

FIG. 4D illustrates more details about the spacetile punch illustrated in FIG. 4C in some embodiments. More specifically, FIG. 4D illustrates a close-up of the area 410C in FIG. 4C. As described in the preceding paragraphs with reference to FIGS. 4A-B, the method or system may perform the spacetile punch to form three spacetiles—spacetile 404D representing the area above, spacetile 402D representing the are below, and a one-dimensional, degenerated spacetile 406D. It shall be noted that although spacetiles 404D and 402D are illustrated with a boundaries defined by line segments 408D and 410D respectively, the degenerated spacetile 406D is one-dimensional and thus is associated with zero width. In other words, 408D and 410D are illustrated in FIG. 4D to indicate the creation of three spacetiles but do not intend to imply that spacetile 406B is associated with any non-zero width values.

If the placement tool determines the spacing between 402C and 404C in such a way (e.g., to minimize the use of real estate while satisfying all design rules) that the bottom of the space 406C coincides with the top of the space 408C, a viable spacetile 406D is thus created for this particular configuration. The method or system may then use the spacetile 406D as an area probe to route the electronic circuit by searching along the area probe 406D, which is a one-dimensional line segment. It shall be noted that the other spacetiles may not be viable options for area probes because, for example, the spacetile 404D above 406D determined by the spacetile punch for the second component 404C encroaches upon the punched out space defined by 406C, and the spacetile 402D below 406D determined by the spacetile punch for the first component 402C encroaches upon the punched out space defined by 408C.

In this example, the method or system may then determine to run the interconnect between 402C and 404C by placing the centerline of the interconnect within the area probe 406D—that is, right on the area probe 406D because the space probe 406D constitutes a degenerated spacetile. An area probe represents a n-dimensional geometric entity in which or on which the center line(s) of interconnect(s) may lie and thus may be used by various embodiments of the method or system to perform area search in order to determine the route for an interconnect. An area probe may be used to store information such as the information about the spacetile itself, various information about routing the interconnect (e.g., exact or approximate location, distance, or direction of the destination, exact or approximate location, direction, or distance of the beginning point of the route, or associated design rule(s), etc.) to guide search for routing the interconnect through the spacetiles in some embodiments. In some embodiments, an spacetile may be used to implement an area probe.

Figure 5:
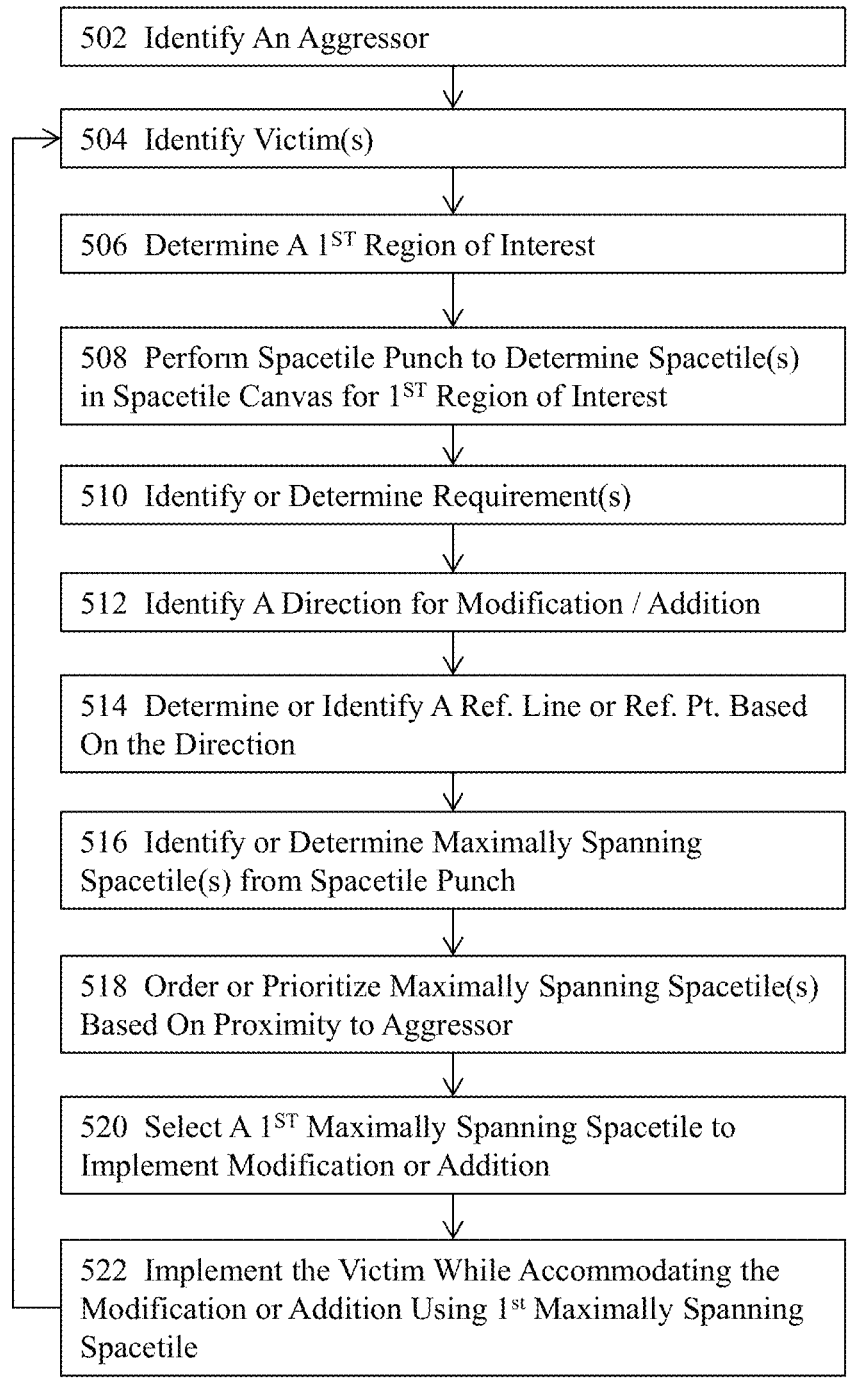
FIG. 5 illustrates a more detailed flow diagram for implementing multi-layer local maximal routing paths in some embodiments.

FIG. 5 illustrates a more detailed flow diagram for implementing multi-layer local maximal routing paths in some embodiments. In one or more embodiments, the method may comprise the process 502 of identifying an aggressor due to an modification or addition to an electronic circuit design. For example, a circuit feature may be added or modified (e.g., by lengthening or moving the circuit feature) to a layout, and the added circuit feature may violate one or more requirements with respect to one or more victim circuit features. In this example, the circuit feature which, when added or modified, may violate one or more requirements is identified as the aggressor.

The method may further comprise the process 504 of identifying one or more victims. In some embodiments, the method may identify the one or more victims based at least in part upon the addition or modification of the aggressor. For example, if a first interconnect segment is to be pushed or lengthened such that the pushed or modified first interconnect may encroach upon a space claimed by a set of interconnect segments after the modification so as to violate one or more requirements, the method may identify the first interconnect segment as the aggressor and the set of interconnect segments the victims. In some embodiments, the method may further comprise the process 506 of determining a first region of interest. In some of these embodiments, the method may determine the first region of interest based at least in part upon a first victim circuit feature of the one or more victims.

In some embodiments, the method may identify the victim circuit feature that is closest to the aggressor as the first victim circuit feature because such the closest circuit feature may be first affected by the addition or modification of the aggressor which, for example, may be pushed along a certain direction. In some embodiments, the method or system may identify the victim circuit feature that is farthest away from the aggressor. In some embodiments where each victim circuit feature is treated individually, the order of processing each victim circuit feature may not be of significance. In some embodiments, the method identifies all the victim features as a set and performs various processes on the set as a whole, rather than treating the victim circuit features in the set individually.

For example, if the addition or modification of an aggressor may encroach upon the space claimed by five parallel interconnect segments that are required by, for example, certain requirement(s) to maintain their relative order to each other, the method may identify all five parallel interconnect segments as a set and performs various processes to either move, push, modify, or re-route the five parallel interconnect segments together. In some embodiments, the method may further comprise the process 508 of performing a spacetile punch to identify, determine, or generate one or more spacetiles for the first region of interest. In some embodiments, a region of interest may comprise an area in the electronic circuit design that encompasses at least the first victim circuit feature.

In some embodiments where the first victim is an interconnect segment, a region of interest comprises an area (in the electronic circuit design) that encompasses the entire net or at least a part of the entire net to which the first victim circuit feature belongs. In some embodiments, a region of interest comprises an area (in the electronic circuit design) that encompasses the first victim circuit feature and at least one other victim circuit feature, if the at least one other victim circuit feature exists. In some embodiments, a region of interest comprises a dynamic region in the electronic circuit design, and the region of interest dynamically changes based at least in part upon the victim circuit feature that is being processed. In some embodiments, the method may also include the process 510 of identifying one or more requirements. In some embodiments, the method may also include the process 512 of identifying a direction that is associated with the addition or modification of the aggressor. For example, if the aggressor is moved or stretched in the upward or north direction (when looking at a plain view of an electronic design), the method may identify the upward or north direction as the first direction in this example.

Figure 6:
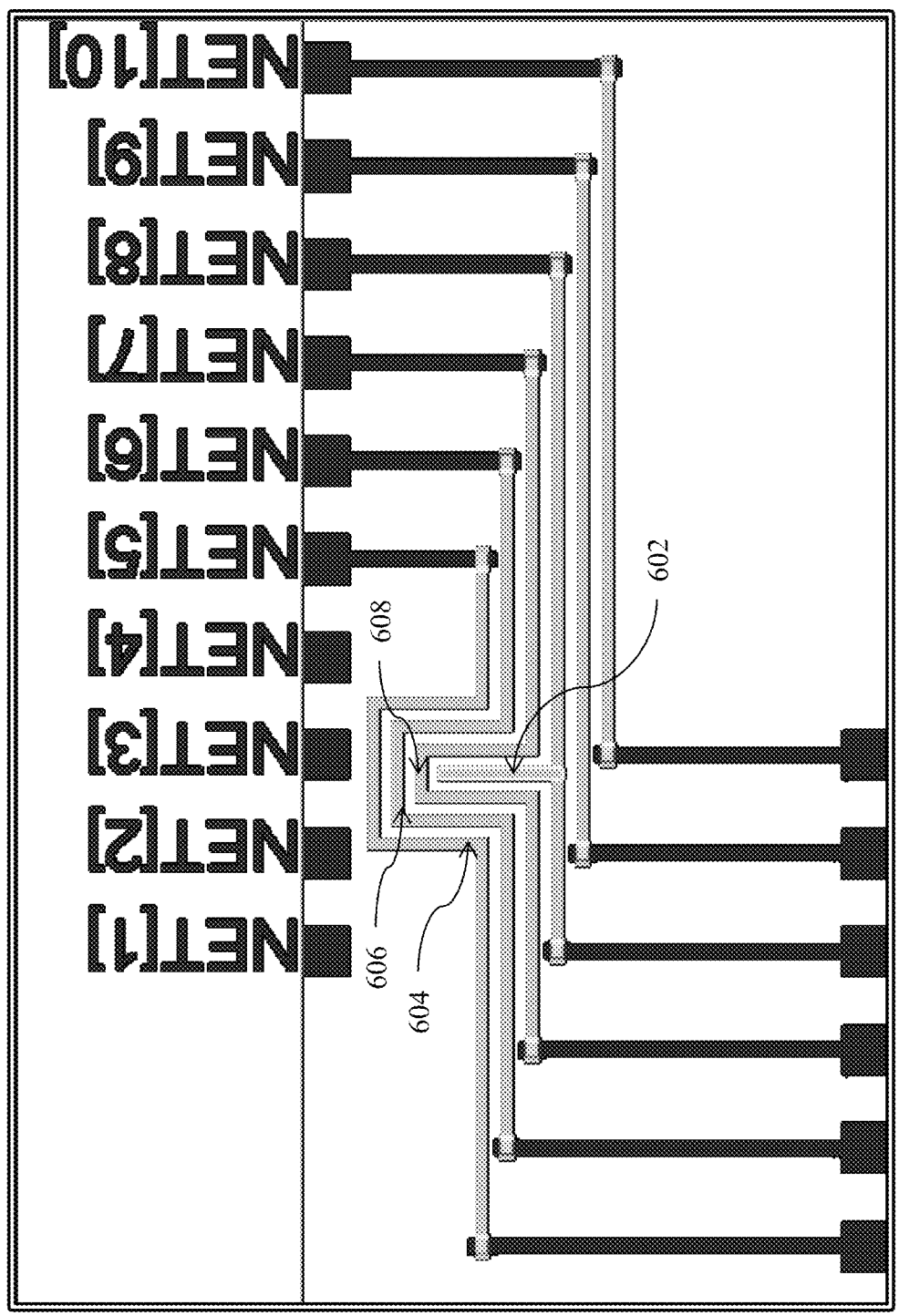
FIG. 6 illustrates a portion of an exemplary electronic circuit design where an aggressor shape produces legal victim shapes with multiple bends in some embodiments.

At 514, the method may further determine or identify a reference line or a reference point based at least in part on the direction identified at 512. For example, if an aggressor 602 as shown in FIG. 6 is added or modified toward the north direction (the upper part of FIG. 6 being north, and the right-hand part being east), the method may identify the south-most line in the region of interest as the reference line, or a point along the south-most line in the region of interest as the reference point. For example, the method may identify the south-most boundary segment of the aggressor polygon as the reference line or any point, e.g., the lower left-hand corner or the lower right-hand corner of the south-most boundary segment of the aggressor polygon as the reference point. In another similar example where the aggressor 602 is added or stretched from above the interconnect segments 604, 606, and 608 towards the south, the method may identify the north-most boundary segment of the aggressor polygon 602 as the reference line or any point, e.g., the upper right-hand corner or the upper left-hand corner, on the north-most boundary segment of the aggressor polygon 602 as the reference point.

In these examples, the reference line or the reference point does not necessarily have to be on the aggressor and may be placed on any geometric or imaginary line or point (e.g., grid lines or grid points.) In some embodiments, the method identifies the reference line or the reference point in a way to facilitate assigning orders or priorities among the victim circuit features. In the first example above where the aggressor 602 is, for example, stretched toward the north direction, the method may identifies the south-most boundary segment of the aggressor polygon as the reference line or any point, e.g., the lower left-hand corner or the lower right-hand corner of the south-most boundary segment of the aggressor polygon as the reference point because doing so will cause all the victims to be on one side of the reference baseline or reference point, and thus the available space and hence the spacetiles to be created are also on one side of the reference baseline or the reference point. In this example, the method may easily assign orders or priorities to the spacetiles in the available space (after spacetile punch, which will be described later) according to, for example, their proximity to the reference line or reference point.

In some embodiments, the method may further optionally comprise the process 518 of identifying or determining one or more local, maximally spanning spacetiles that are determined by one or more spacetile punches. Spacetile punch has been described in greater details with reference to FIGS. 4A-D. In some embodiments, the method may further optionally comprise the process 518 of ordering or prioritizing the one or more local, maximally spanning spacetiles generated from the one or more spacetile punches at 516. In some of these embodiments, the method may order or prioritize the one or more local, maximally spanning spacetiles based on their respective proximity to the aggressor, the reference line, or the reference point.

In some embodiments, the method may comprise the process 520 of identifying or selecting a first local, maximally spanning spacetile from the one or more local, maximally spanning spacetiles to implement the modification or addition. In some of these embodiments, the method may identify or select the local, maximally spanning spacetile that has the highest priority or order to implement the modification or addition. At 522, the method may then implement the one or more victims while accommodating the modification or addition of the aggressor using the first local, maximally spanning spacetiles and satisfying requirements for the aggressor and the one or more victims.

FIG. 6 illustrates a portion of an exemplary electronic circuit design where an aggressor shape produces legal victim shapes with multiple bends in some embodiments. In addition to the description of the various interconnect segments 602, 604, 606, and 608 in the preceding paragraphs describing the process 514, FIG. 6 illustrates a viable solution for implementing the modification or addition of the aggressor 602, although each of interconnect segments 604, 606, and 608 exhibits multiple bends (four bends for each interconnect segment) in this viable routing solution. In some embodiments where no bends are allowed in these interconnect segments or in this region where interconnect segments 604, 606, and 608 are located, the solution shown in FIG. 6 will violate the requirement and is thus illegal.

Figure 7:
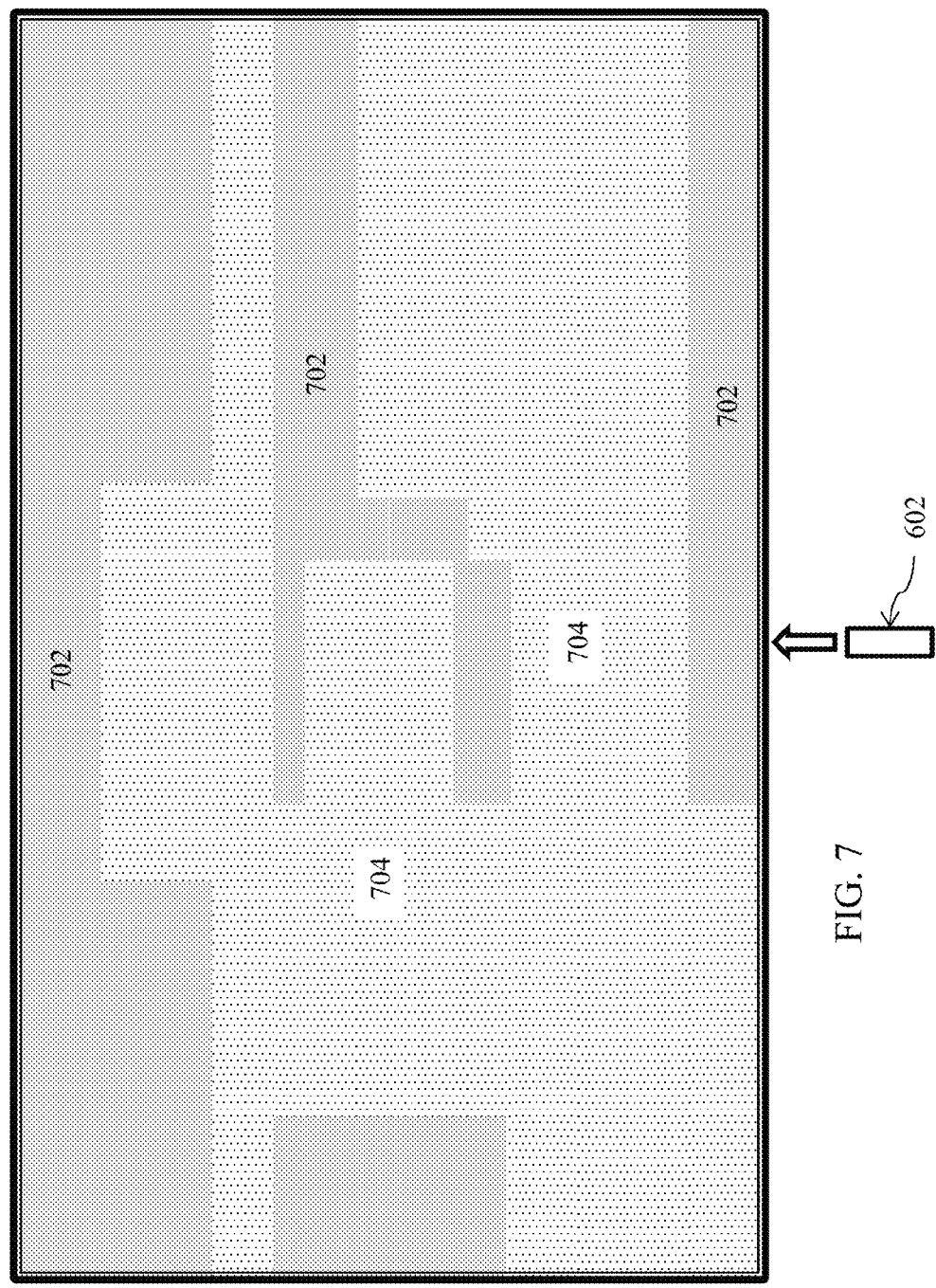
FIG. 7 illustrates a portion of a tessellated region with free spacetiles of the exemplary electronic circuit design of FIG. 6 in some embodiments.

FIG. 7 illustrates a portion of a tessellated region of interest with free spacetiles of the exemplary electronic circuit design of FIG. 6 in some embodiments. More specifically, FIG. 7 illustrates an exemplary region of interest where 704 indicates available space with spacetiles, and 702 indicates unavailable space for the generation of spacetiles. The available space and unavailable space may be determined by the spacetile punch process that "punches" out the space that is occupied or claimed by circuit features. The relative position of the aggressor 602 to the available space and the unavailable space is also shown in FIG. 7. It shall be noted that the boundaries of the spacetiles in the area denoted 704 from the spacetile punch process are not shown in FIG. 7 for clarity.

Figure 8:
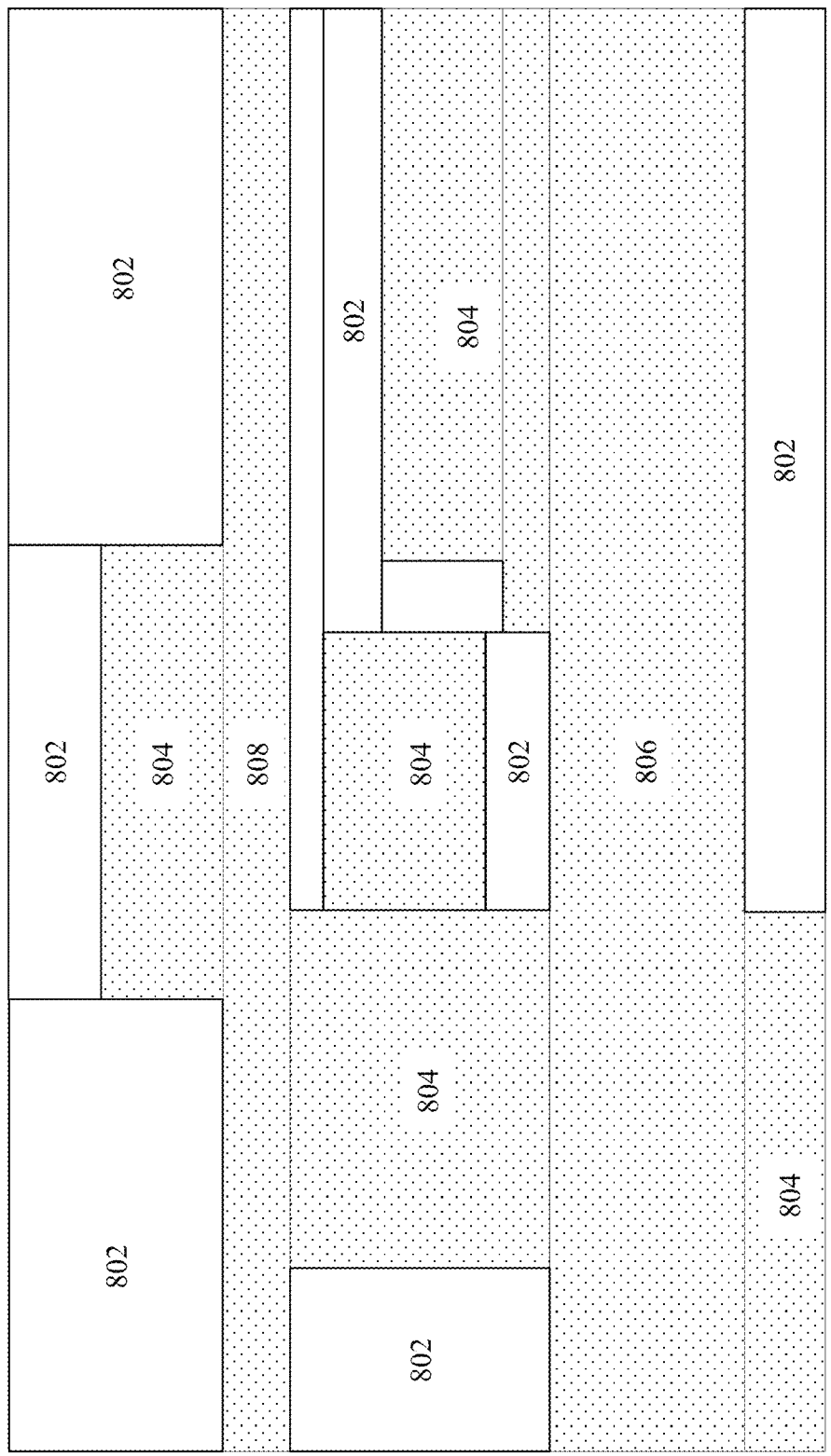
FIG. 8 illustrates some examples of maximally spanning spacetiles for the tessellated region shown in FIG. 7 in some embodiments.

FIG. 8 illustrates some examples of maximally spanning spacetiles for the tessellated region of interest shown in FIG. 7 in some embodiments. More specifically, 802 represents blocked areas that are not available for the generation of spacetiles. 804 represents the spacetiles. In this exemplary plot of the tessellated region of interest, the spacetiles may be generated directly from the spacetile punch process or some additional partitioning or merging processes after the spacetile punch process. In some embodiments where the spacetiles generated by the spacetile punch process may be fragmented, the method may perform the partitioning or merging processes may further merge multiple spacetiles into one spacetile or partition one larger spacetile into multiple smaller spacetiles.

In some embodiments where the width (in the horizontal direction) of the region of interest is to be at least the span of, for example, interconnect 608 which is not allowed to have any bends, the method may identify two local, maximally spanning (or maximally horizontal in this example) spacetiles, 806 and 808, because only these two spacetiles 806 and 808 provide sufficient space at least in the horizontal direction to accommodate possible no-bend routing implementations for the interconnect 608.

FIGS. 7-8 also illustrate the dynamic nature of the region of interest. In other words, the region of interest for interconnect segments 608 and 606 in FIG. 6 will be different because each of these two interconnect segments 606 and 608 may need a different area located at a different part of the electronic circuit design to accommodate a no-bend solution. Therefore, when the regions of interest for 606 and 608 are determined to cover only the span of the interconnect segments 606 and 608 in which no bends are allowed, these two regions of interest for 606 and 608 will be different in this example. In other words, the region of interest changes as the method proceeds to process different interconnect segments and is thus of a dynamic nature. In some other embodiments, the region of interest may be dynamic where the method may determine the maximal span to accommodate all the victim circuit features for which no bends are allowed. These embodiments simplify at least the determination of the region of interest, although at the expense of using more area than necessary to find viable solutions by using local, maximally spanning spacetiles.

Figure 9:
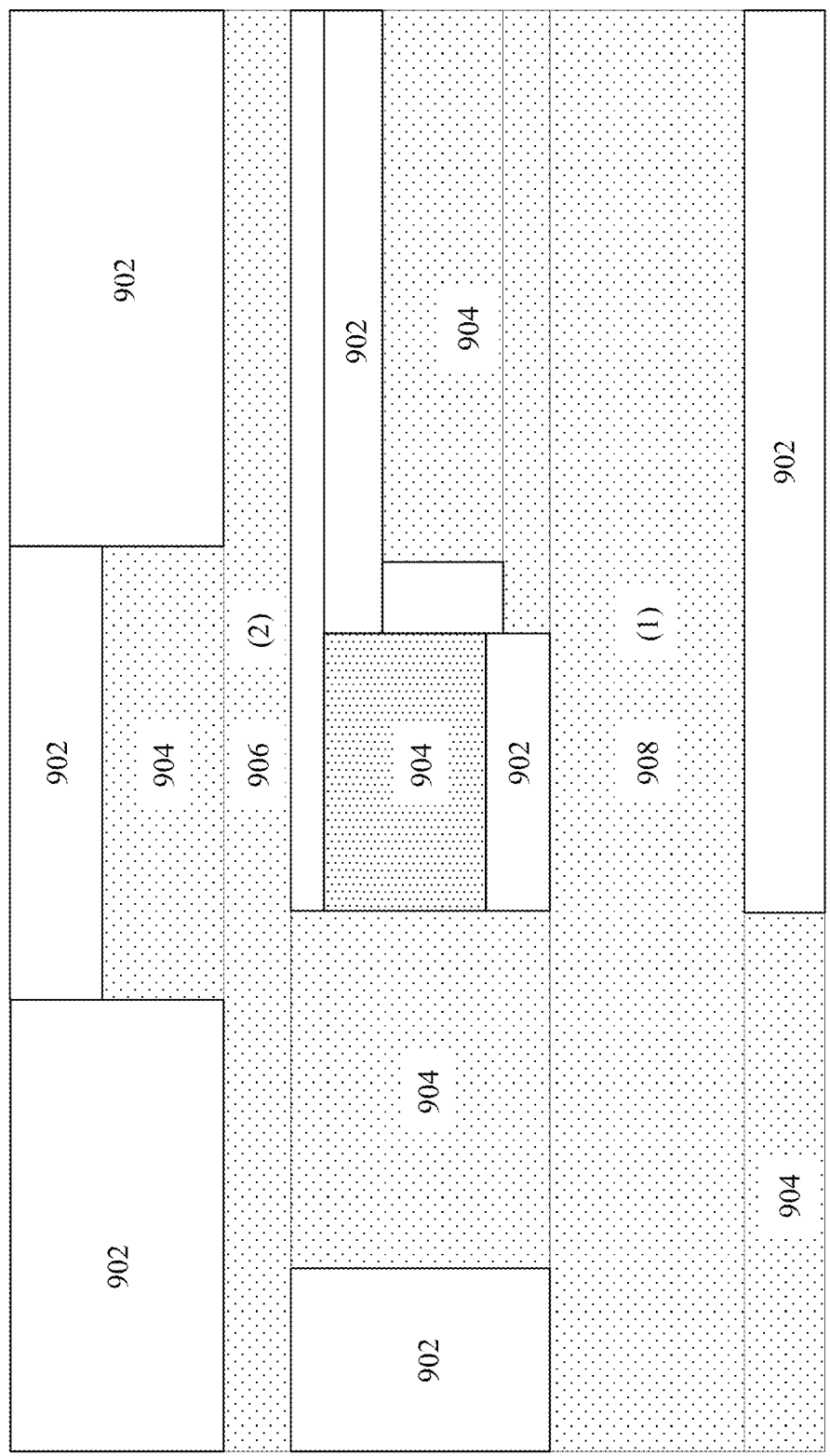
FIG. 9 illustrates a result of sorting the maximally spanning spacetiles shown in FIG. 8 in some embodiments.

FIG. 9 illustrates a result of sorting the maximally spanning spacetiles shown in FIG. 8 in some embodiments. In this exemplary plot, 902 indicates the unavailable space, 904 indicate some space tiles, and 906 and 908 represent two local, maximally spanning spacetiles. FIG. 9 also illustrates the example where the method may assign the highest order or priority (e.g., "(1)" as shown in FIG. 9) to the first local, maximally spanning spacetile 908 and the next highest order or priority (e.g., "(2)" as shown in FIG. 9) to the second local, maximally spanning spacetile 906 based on their respective proximity to the aggressor 602 as shown in FIGS. 6-7.

Figure 10:
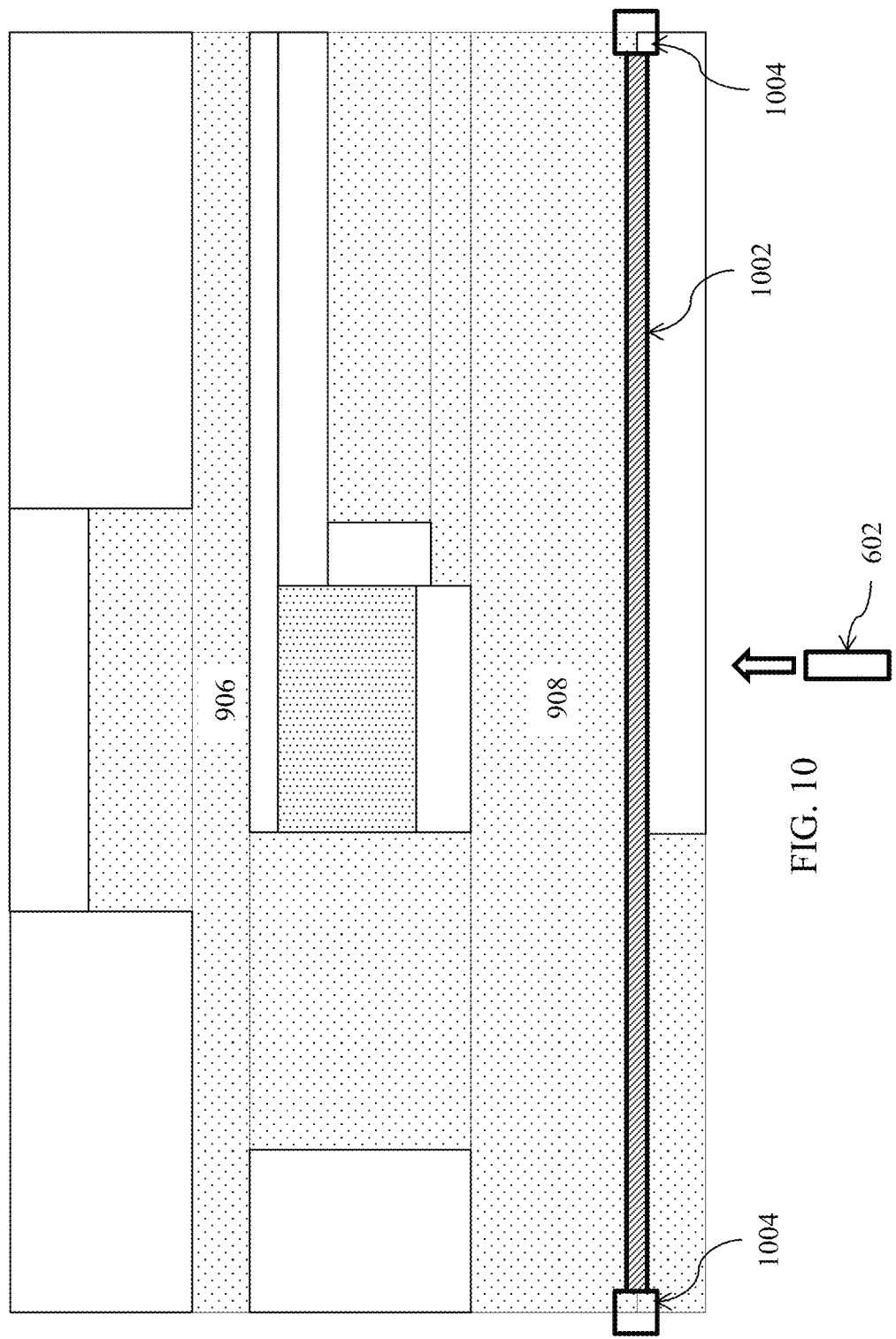
FIG. 10 illustrates an exemplary implementation of an interconnect by using a sorted, maximally spanning spacetile in some embodiments.

FIG. 10 illustrates an exemplary implementation of an interconnect by using a sorted, maximally spanning spacetile in some embodiments. More specifically, FIG. 10 shows that the method identifies the bottom edge of the first local, maximally spanning spacetile 908 to implement the first victim circuit feature 1002 (e.g., interconnect segment 608 in FIG. 6) with two vias 1004 at both ends of 1002. FIG. 10 also shows the relative position of the aggressor 602, which is illustrated with greater details in FIG. 6. Moreover, the second local, maximally spanning spacetile 906 is not selected to implement the first victim circuit feature 1002.

In addition, FIG. 10 shows that the region of interest (and hence the length of the local, maximally spanning spacetiles 906 and 908) has a width (in the horizontal direction) that covers not only the span of the interconnect segment 1002 but also one full diameter or width (2× half of the width or 2× radius) of the via 1004. Because a spacetile comprises a zero-, one-, or two-dimensional geometric entity in the routing space within, along, or at which the centerline of an interconnect or a center of a circuit feature (e.g., a via) may lie, the method may choose the bottom edge of the local, maximally spanning (or maximally horizontal in this example) spacetile for the center of the interconnect segment 1002. That is, the bottom half of the interconnect segment 1002 extends beyond the bottom edge of the spacetile 908 to reduce or minimize the use of available area to implement the interconnect segment 1002 in this example.

Figure 11:
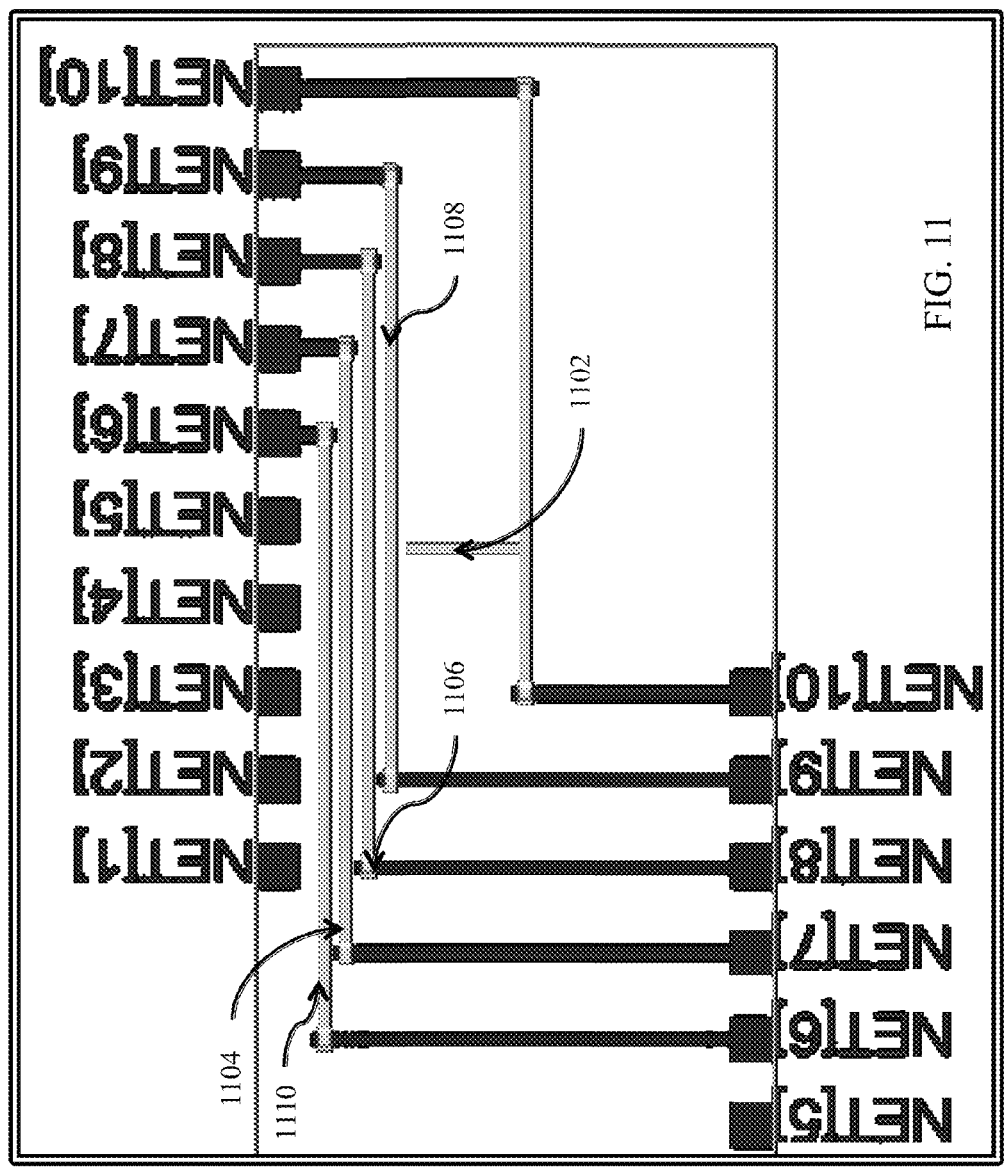
FIG. 11 illustrates a different layout of the portion of the electronic circuit shown in FIG. 6 by performing a pushing function on some interconnects in the portion of the electronic circuit design in some embodiments.

FIG. 11 illustrates a different layout of the portion of the electronic circuit shown in FIG. 6 by performing a pushing function on some interconnects in the portion of the electronic circuit design in some embodiments. More specifically, FIG. 11 illustrates a viable solution that accommodates the addition or the modification of the aggressor 1102 as well as moving, pushing, or re-routing the four interconnect segments 1104, 1106, 1108, and 1110, while satisfying a requirement that allows no bends for these four interconnect segments. It shall be noted that FIGS. 6 and 11 merely schematically illustrates viable solutions for accommodating the addition or modification of the aggressor 1102, and that both figures are simplified without showing all the circuit features. For example, FIG. 6 shows the aggressor that negatively affects three interconnect segments 604, 606, and 608 with multiple bends, and FIG. 11 shows the similar aggressor 1102 with four interconnect segments 1104, 1106, 1108, and 1110.

Figure 12:
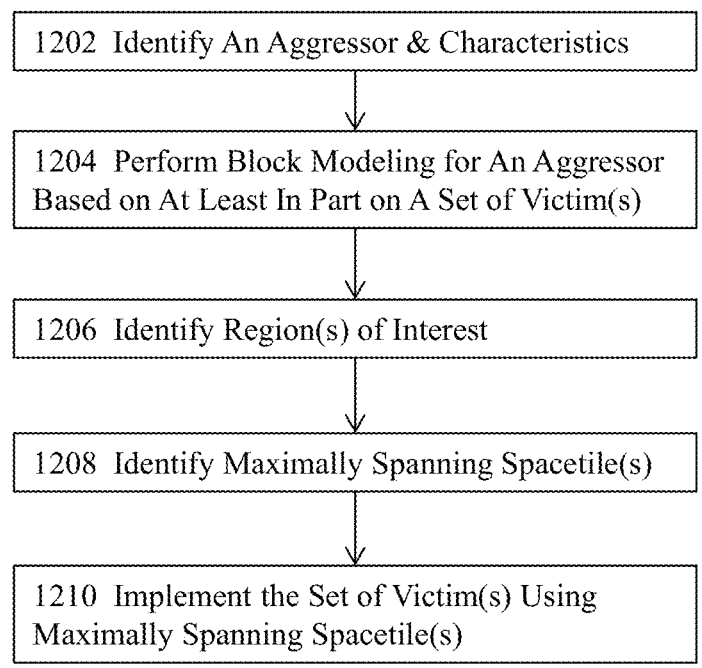
FIG. 12 illustrates a top level flow diagram for implementing routing paths while preserving the relative order of the routing paths in some embodiments.

FIG. 12 illustrates a top level flow diagram for implementing multi-layer routing paths while preserving the relative order of the routing paths in some embodiments. In one or more embodiments, the method for implementing multi-layer routing paths may include the process 1202 of identifying an aggressor in an electronic circuit. In some embodiments, the process 1202 may identify the aggressor due to an addition of the aggressor, which negatively affects one or more other victim circuit features, to the electronic design. In some embodiments, the process 1202 may identify the aggressor due to a modification of an existing circuit feature, which modification negatively affects one or more other victim circuit features, to the electronic design.

In some embodiments, the process 1202 may further identify one or more characteristics associated with the aggressor. For example, the process 1202 may identify the position, the geometric shape, or the direction of the addition or modification of the aggressor, etc. At 1204, the method may further perform block modeling for the aggressor identified at 1202. The method may further comprise the process 1206 of identifying a region of interest in some embodiments. The process 1204 will be described in greater details in subsequent paragraphs with reference to FIG. 14. In some of these embodiments, the process 1206 may identify the region of interest based at least in part upon the aggressor or the one or more characteristics associated with the aggressor. In some of these embodiments, the process 1206 may identify the region of interest based at least in part upon one or more victim circuit features that may be negatively affected by the aggressor.

As described in some of the preceding embodiments or examples, the region of interest may be a dynamic region in the electronic circuit, depending upon the victim circuit feature that is being processed or a static region by accounting for possible victim circuit features all at once. In some embodiments, the method may include the process 1208 of identifying one or more local, maximally spanning spacetiles in the region of interest by performing substantially similar process(es) as described previously with reference to FIGS. 2-5. At 1210, the method may implement a set of circuit features by at least using one of the one or more local, maximally spanning spacetile while accommodating the aggressor in some embodiments. In some of these embodiments, the method uses a computing system to implement the set of circuit features by performing the process 1210 while satisfying one or more requirements.

In some embodiments where at least some of the set of circuit features comprises multiple pre-existing circuit features in the electronic circuit design, the one or more requirements may include a requirement of preserving the relative order of such multiple pre-existing circuit features in the electronic circuit design. In some embodiments where the entire set of circuit features comprises new circuit features to be added to the electronic circuit design, the one or more requirements may include a requirement of adding the set of circuit features to the electronic circuit design with a specific relative order. For example, for an exemplary embodiment as shown in FIG. 11, the requirement of preserving the relative order may require or prefer that the interconnect segment 1110 be connected to NET[6], that the interconnect segment 1104 be connected to NET[7], that the interconnect segment 1106 be connected to NET[8], and that the interconnect segment 1108 be connected to NET[9], while implementing the interconnect segments 1104, 1106, 1108, and 1110 in the electronic circuit design, regardless of whether or not these four interconnect segments are pre-existing in or are to be newly added to the electronic circuit design.

Preserving the relative order of certain circuit features may be of some importance in, for example, a bus design (e.g., a data bus, a memory bus, a data bus, etc.) that transfers data among components of a computing system with parallel or bit serial connections. It shall be noted that although certain examples described herein for implementing multi-layer routing paths while preserving the relative order of the routing paths show straight interconnect segments without bends (e.g., 1406, 1414, 1416, and 1418 of FIG. 14, 1504 of FIG. 15, 1604 of FIG. 16, and 1704 of FIG. 17), various embodiments for implementing multi-layer routing paths while preserving the relative order of the routing paths may equally applied to a bundle of interconnect segments, each of which having one or more bends while achieving the same results—preserving the relative order among the bundle of interconnect segments. Therefore, the term "local, maximally spanning interconnect segment" in these embodiments refer to the interconnect segments that are "local, maximally spanning" within a local region and do not necessarily refer to the no-bend solutions described in other embodiments with reference to FIGS. 2-5.

Figure 13:
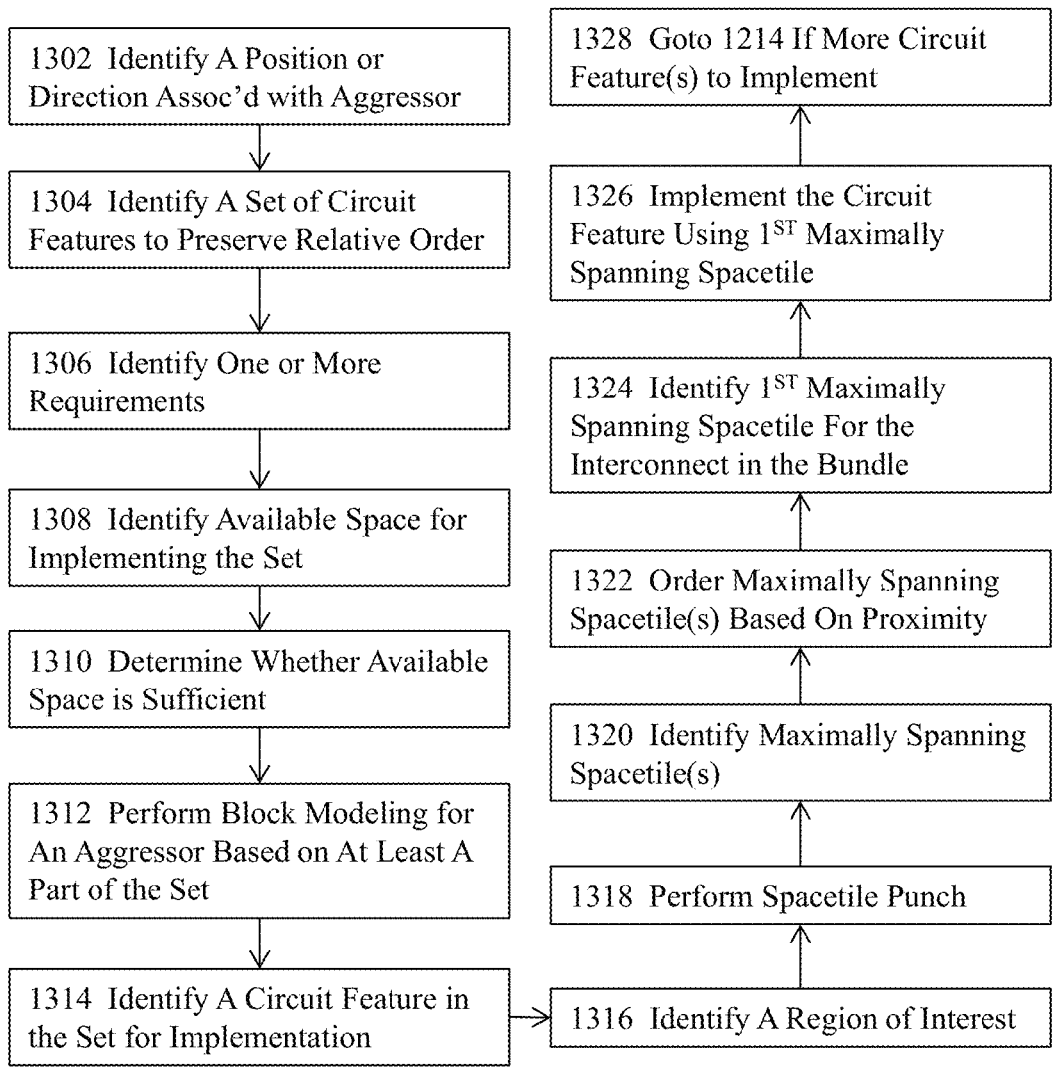
FIG. 13 illustrates a more detailed flow diagram for implementing routing paths while preserving the relative order of the routing paths in some embodiments.

FIG. 13 illustrates a more detailed flow diagram for implementing multi-layer routing paths while preserving the relative order of some circuit features in some embodiments. In one or more embodiments, the method for multi-layer routing paths while preserving the relative order of some circuit features may comprise the process 1302 of identifying the position or a direction associated with the aggressor. For example, the process 1302 may identify the desired location for adding or modifying a circuit feature (e.g., an aggressor) that may negatively affect one or more other circuit features (e.g., victim circuit features). As another example, the process 1302 may identify the desired direction of adding or modifying (e.g., moving, stretching, etc.) a circuit feature (e.g., the aggressor) that may negatively affect one or more other circuit features (e.g., the one or more victim circuit features).

At 1304, the method may further comprise the process of identifying a set of circuit features whose relative order needs to be maintained or preserved while accommodating the addition or modification of the aggressor. For example, the process 1304 may identify a bundle of interconnect segments whose relative order needs to be preserved. In some embodiments, the method may further identify one or more requirement that are preferred or required to be satisfied at 1306. In some embodiments, the method may also include the process 1308 of identifying the available space for implementing the set of circuit features. Using the exemplary configuration shown in FIG. 11 as an example, the process 1308 may identify the available space in the region of interest for implementing the interconnect segments 1104, 1106, 1108, and 1110 while trying to accommodate the addition or modification of the aggressor 1102 at 1308.

At 1310, the method may determine whether the available space identified at 1308 is sufficient to implement the set of circuit features. In some embodiments where the available space identified at 1308 is determined to be insufficient to implement the set of circuit features, the method may terminate or issue a message to indicate that there is no viable solution to accommodate the addition or modification of the aggressor and to implement the set of circuit features while preserving the relative order of the set of features in the current electronic design without making other changes. In some embodiments, the method may provide hint, suggestions, or recommendations for how to modifying the electronic circuit design so as to implement the set of circuit features and to accommodate the addition or modification of the aggressor, while preserving the relative order of the set of circuit features.

In some embodiments where it is determined that the available space is sufficient to implement the set of features, the method may further comprise the process 1312 of performing block modeling for the aggressor. In some of these embodiments, the method may perform block modeling for the aggressor based at least in part upon the set of features that are to be implemented while preserving their relative order. In some embodiments, the method may include the process 1314 of identifying a circuit feature from the set of circuit features to implement. At 1316, the method may identify a region of interest. In some embodiments, the method may identify the region of interest at 1316 based at least in part upon the circuit feature that is identified at 1314.

At 1318, the method may perform spacetile punch to determine one or more spacetiles in the region of interest. At 1320, the method may then identify one or more local, maximally spanning spacetiles that may be used to implement at least the circuit feature identified at 1314. At 1322, the method may further optionally prioritize or order the one or more local, maximally spanning spacetiles by assigning respective orders or priorities to the one or more local, maximally spanning spacetiles. Order or prioritizing the local, maximally spanning spacetiles has been described in greater details in some of the preceding paragraphs with reference to FIGS. 3-4.

At 1324, the method may identify a first local, maximally spanning spacetile from the one or more local, maximally spanning spacetiles. In some embodiments, the method may identify the first local, maximally spanning spacetile based at least in part upon the order or priority of the local, maximally spanning spacetiles. At 1326, the method may implement the circuit feature identified at 1314 by using at least the first local, maximally spanning spacetile. At 1328, the method determines whether there exist more circuit features in the set to implement and loops back to 1214 if the method determines that there does exist at least one circuit feature in the set to implement.

Figure 14:
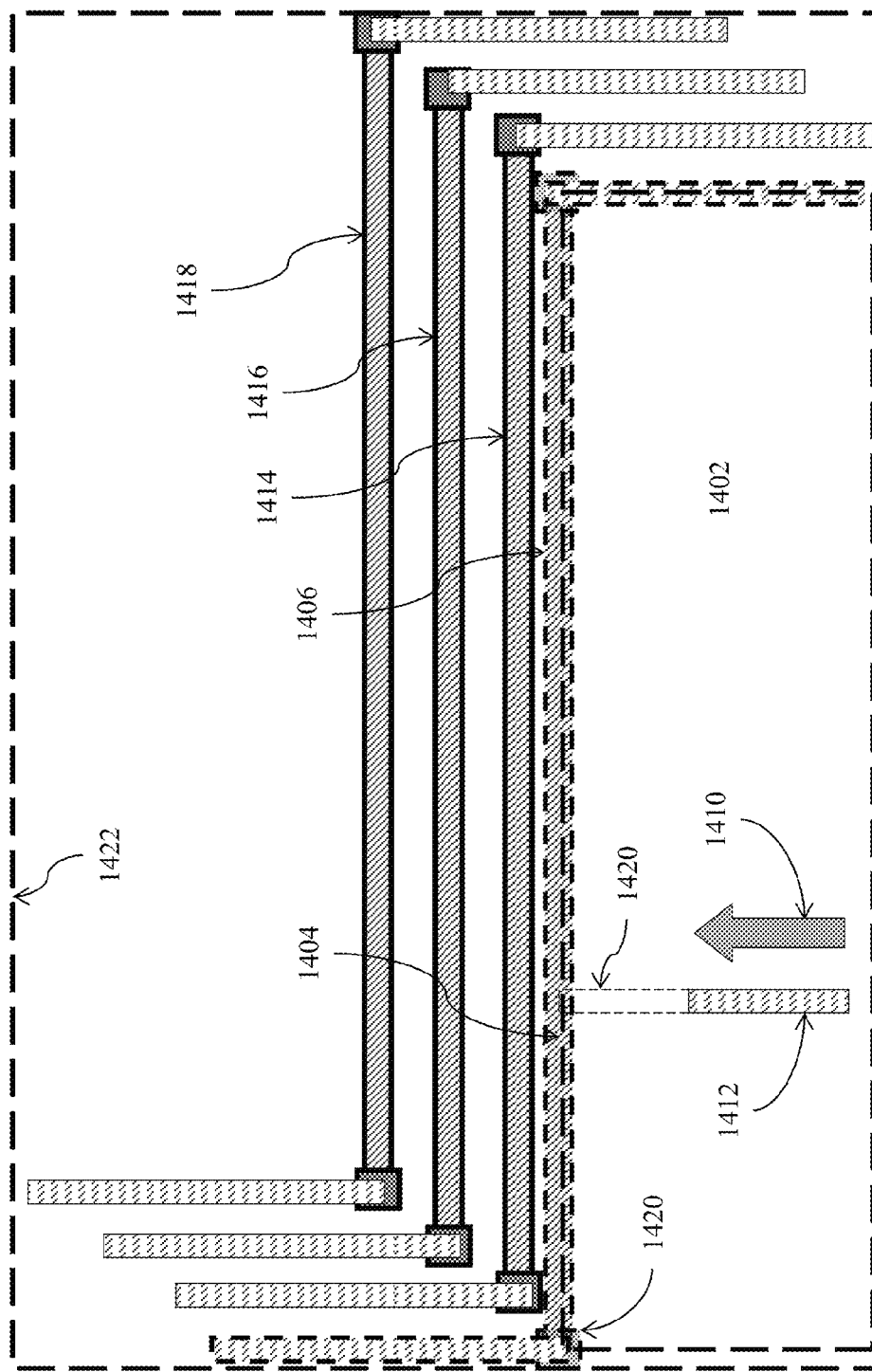
FIG. 14 illustrates an exemplary modeling of an aggressor in some embodiments.

FIG. 14 illustrates an exemplary modeling of an aggressor in some embodiments. More specifically, FIG. 14 illustrates an exemplary block modeling for an aggressor 1412 with a direction of addition of modification 1410 for the aggressor that, when moved or added at the final position 1420 which encroaches upon the space claimed by 1406, may negatively affect the interconnect segments 1406, 1414, 1416, and 1418. In this example, the set of circuit features comprises the four interconnect segments 1406, 1414, 1416, and 1418. The method may then perform block modeling for the aggressor 1412 where the method may identify the first dimension (e.g., the length of 1406, the length of 1406 plus two times of the half-width of the via 1420, the length of 1406 plus two times the width of the via 1420, etc.) of the first interconnect segment (e.g., 1406) to be affected or processed (after the addition or modification of the aggressor 1412) due to the addition or modification of the aggressor 1412.

The method may then use this dimension of the first interconnect segment as the width 1404 of the block modeling for the aggressor 1412 in some embodiments. In this example where the aggressor 1402 is moved or stretched in the upward direction 1410, the method may further identifies the length of the block modeling for the aggressor 1412 as the space below the first interconnect segment in the region of interest 1422. In this example, the method practically "blocks" the space in the direction of the first interconnect segment (e.g., 1406) that is opposite to the direction of the addition or modification 1410 in modeling the aggressor 1412.

It shall be noted that the lower boundary of the block modeling for the aggressor 1412 does not necessarily have to be coincident with the lower boundary of the region of interest in some embodiments. In these embodiments, the method will not inadvertently use the space that is "blocked" by the block modeling of the aggressor 1412 in implementing the first interconnect segment that is being considered or processed or for one or more other interconnect segments (e.g., 1414, 1416, or 1418). Moreover, the method may then use the available space above the block modeling 1402 of the aggressor 1412 to implement the first interconnect segment or the set of interconnect segments including 1406, 1414, 1416, and 1408, whose relative order needs to be preserved.

Figure 15:
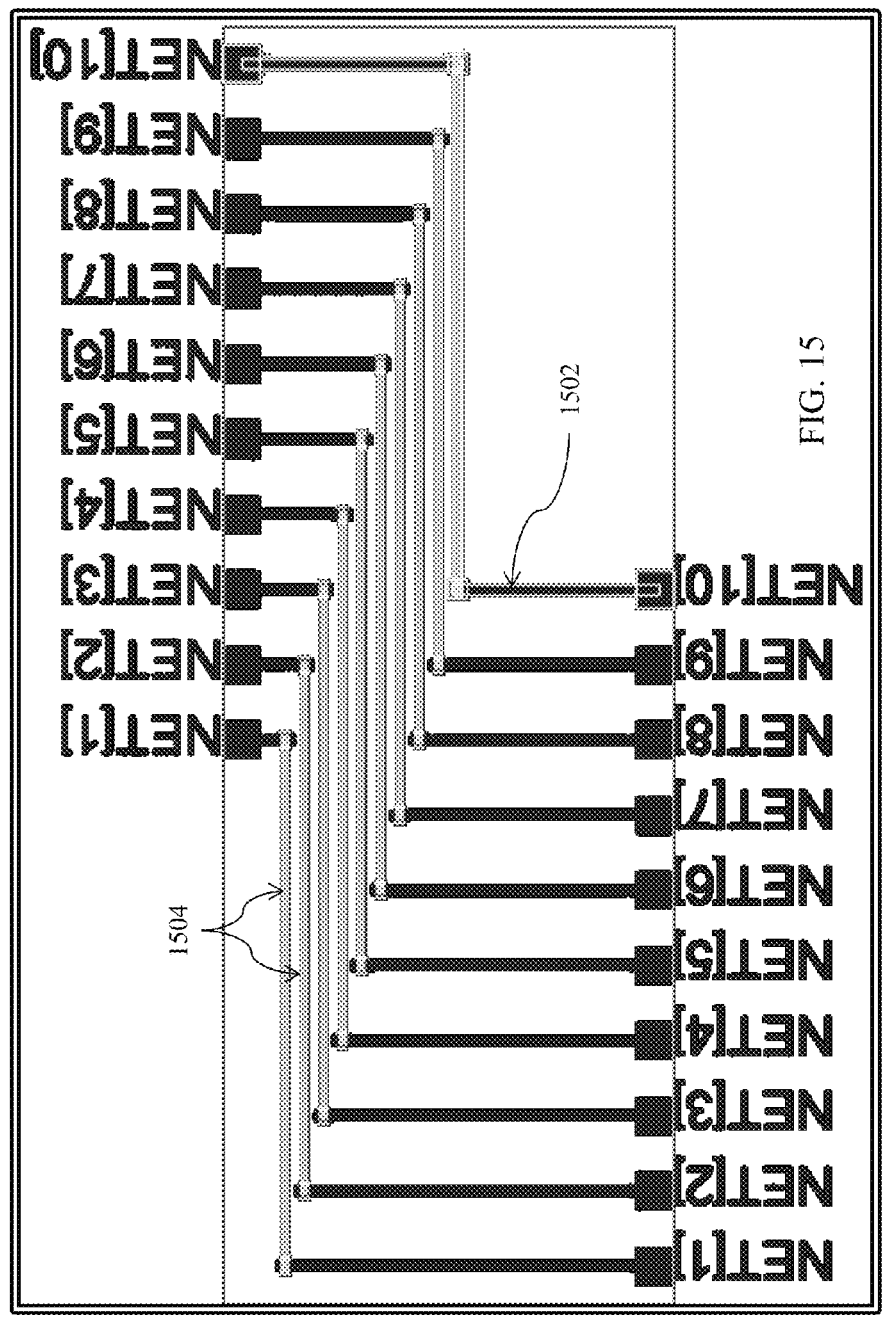
FIG. 15 illustrates the initial design of a portion of an electronic circuit design prior to an exemplary addition or modification of an interconnect segment that results in an aggressor in some embodiments.

FIG. 15 illustrates the initial design of a portion of an electronic circuit design prior to an exemplary addition or modification of an interconnect segment that results in an aggressor in some embodiments. More specifically, FIG. 15 shows an example of stretching the aggressor 1502 from its current position as shown in FIG. 15. In other words, FIG. 15 illustrates an exemplary configuration of a portion of an electronic circuit design prior to a modification of the aggressor 1502.

Figure 16:
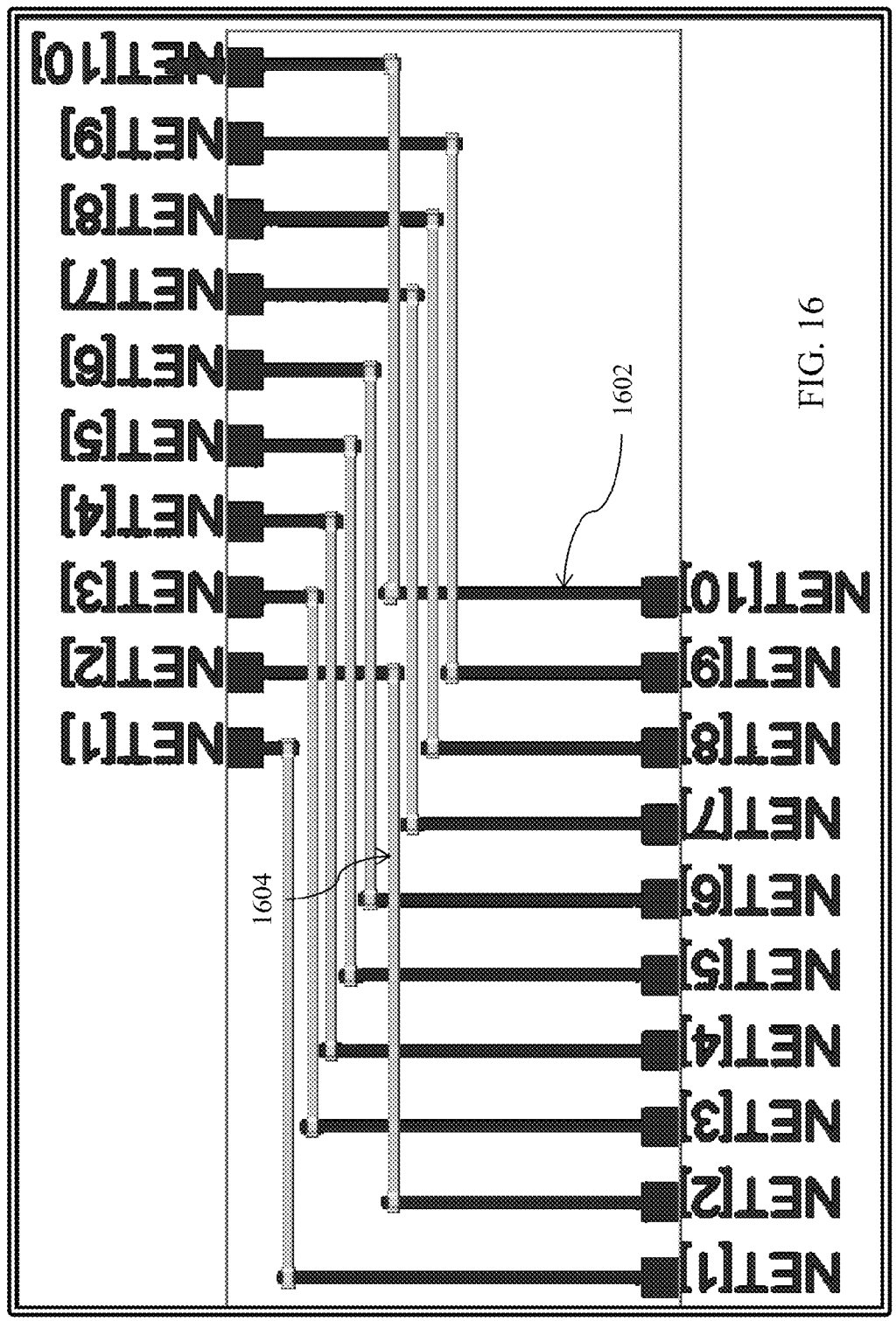
FIG. 16 illustrates the post addition or modification design of the portion of the electronic circuit design after the exemplary addition or modification of the interconnect segment that results in the aggressor without preserving the relative order of some interconnects in some embodiments.

FIG. 16 illustrates the post addition or modification design of the portion of the electronic circuit design after the exemplary addition or modification of the interconnect segment that results in the aggressor without preserving the relative order of some interconnects in some embodiments. More specifically, FIG. 16 illustrates an exemplary configuration of the same electronic circuit design where the aggressor 1602 has been stretched to the current position as shown in FIG. 16. Moreover, FIG. 16 shows a viable solution where, due to the modification of the aggressor 1602 at the final position as shown in FIG. 16, at least one other interconnect segment 1604 is also modified to be connected to NET[2] and thus destroys the relative order of the interconnect segments 1504 shown in FIG. 15. In this example, if the interconnect segments 1504 shown in FIG. 15 are required to preserve their relative order, such a requirement of preserving the relative order cannot be satisfied.

Figure 17:
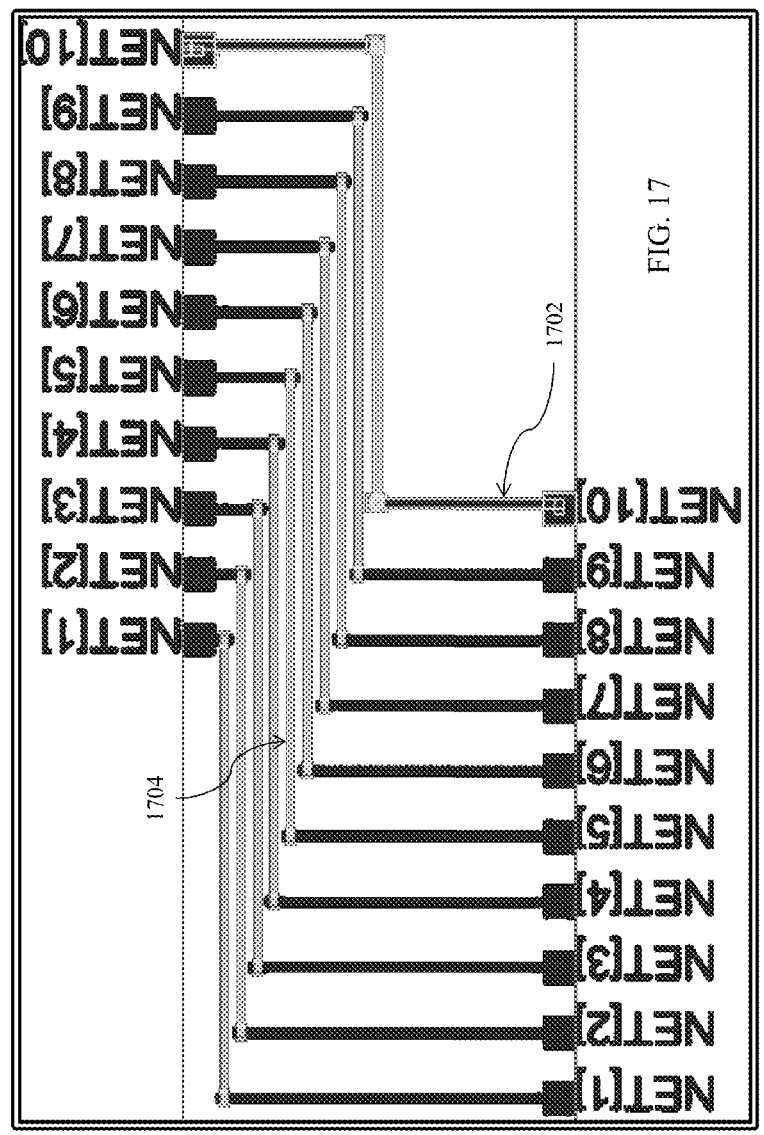
FIG. 17 illustrates another post addition or modification design of the portion of the electronic circuit design that accommodates the aggressor while preserving the relative order of multiple interconnects in some embodiments.

FIG. 17 illustrates another post addition or modification design of the portion of the electronic circuit design that accommodates the aggressor while preserving the relative order of multiple interconnects in some embodiments. More specifically, FIG. 17 shows an example of stretching the aggressor 1502 to its current position as shown in FIG. 17.

FIG. 17 also illustrates a viable solution for implementing the interconnect segments 1704 to accommodate the modification to the aggressor 1702 while preserving the relative order of the interconnect segments 1704. It shall be noted that FIG. 17 is simplified to show only some of the interconnect segments 1704 as compared with the interconnect segments 1504 of FIG. 15. Nonetheless, this simplification is made to clear show the preservation of the relative order of the interconnect segments 1704, and the difference between the number of interconnect segments 1504 and the number of interconnect segments 1704 is insignificant but to clearly illustrate the preservation of the relative order of the interconnect segments 1704 in implementing the interconnect segments 1704 while accommodating the modification of the aggressor 1702.

Various embodiments perform various processes described herein in full effects, regardless of whether certain layers of the electronic design are gridded, gridless, tracked, or trackless. In some embodiments, the method or system may transition between a tracked or gridded layer and a trackless layer and may comprise the respective process or hardware module for performing one or more spacetile punches for the second routing layer with respect to the tracks (if any), circuit components, etc. in the second routing layer. In some embodiments where one or more tracks or one or more grids exist, the method or the system may further perform spacetile punches for the one or more tracks or one or more grids. As a result, the processes described herein equally apply to all electronic circuit designs, regardless of whether or not the electronic circuit design is tracked, trackless, gridded, or gridless. As described previously, a spacetile may a zero-, one-, or two-dimensional entity that can be viewed and treated as an area such that various processes described herein may use the spacetiles to perform area search with area probes. For a two-dimensional spacetile, it is self-explanatory that such a two-dimensional spacetile may be treated as an area. Nonetheless, the zero- or one-dimensional spacetiles may still viewed as areas, although in a degenerated sense, and may still be used by the same processes to perform area search with area probes.

System Architecture Overview

Figure 18:
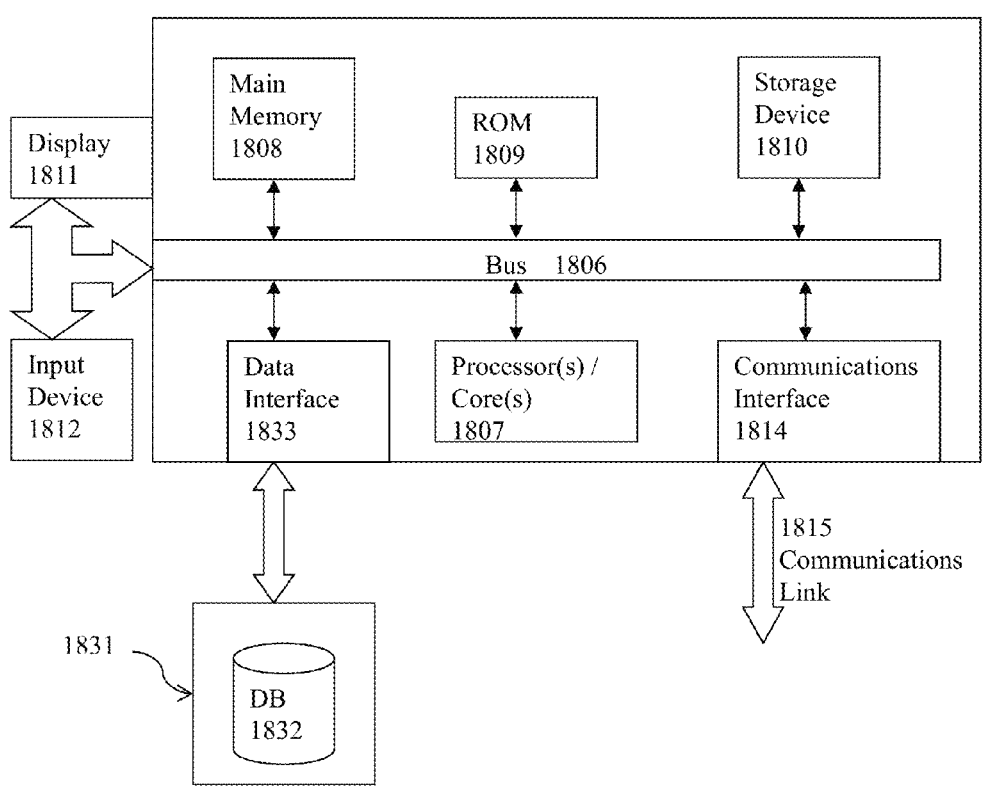
FIG. 18 illustrates a computerized system on which a method for implementing multi-layer local maximal spanning routing paths may be implemented.

FIG. 18 illustrates a block diagram of an illustrative computing system 1800 suitable for implementing a physical electronic circuit design with multiple-patterning techniques as described in the preceding paragraphs with reference to various figures. Computer system 1800 includes a bus 1806 or other communication mechanism for communicating information, which interconnects subsystems and devices, such as processor 1807, system memory 1808 (e.g., RAM), static storage device 1809 (e.g., ROM), disk drive 1810 (e.g., magnetic or optical), communication interface 1814 (e.g., modem or Ethernet card), display 1811 (e.g., CRT or LCD), input device 1812 (e.g., keyboard), and cursor control (not shown).

According to one embodiment, computer system 1800 performs specific operations by one or more processor or processor cores 1807 executing one or more sequences of one or more instructions contained in system memory 1808. Such instructions may be read into system memory 1808 from another computer readable/usable storage medium, such as static storage device 1809 or disk drive 1810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1807, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1807 for execution. Such a medium may take many forms, including but not limited to, non-volatile media and volatile media. Non-volatile media includes, for example, optical or magnetic disks, such as disk drive 1810. Volatile media includes dynamic memory, such as system memory 1808.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1800. According to other embodiments of the invention, two or more computer systems 1800 coupled by communication link 1815 (e.g., LAN, PTSN, or wireless network) may perform the sequence of instructions required to practice the invention in coordination with one another.

Computer system 1800 may transmit and receive messages, data, and instructions, including program, i.e., application code, through communication link 1815 and communication interface 1814. Received program code may be executed by processor 1807 as it is received, and/or stored in disk drive 1810, or other non-volatile storage for later execution. In an embodiment, the computer system 1800 operates in conjunction with a data storage system 1831, e.g., a data storage system 1831 that contains a database 1832 that is readily accessible by the computer system 1800. The computer system 1800 communicates with the data storage system 1831 through a data interface 1833. A data interface 1833, which is coupled to the bus 1806, transmits and receives electrical, electromagnetic or optical signals that include data streams representing various types of signal information, e.g., instructions, messages and data. In embodiments of the invention, the functions of the data interface 1833 may be performed by the communication interface 1814.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing multi-layer local maximal spanning routing paths in an electronic design, comprising:
using at least one processor or at least one processor core to perform a process the process comprising:
determining a region of interest based at least in part upon one or more requirements and a first feature to be implemented in the region of interest, wherein
the one or more requirements includes a design constraint that at least one victim circuit feature in the electronic design needs to satisfy;
determining a local, maximally spanning spacetile for the region of interest; and
implementing the first circuit feature by using at least the local, maximally spanning spacetile for adjusting the at least one victim circuit feature while satisfying the one or more requirements for the at least one victim circuit feature.

2. The computer implemented method of claim 1, wherein the act of determining or identifying the local, maximally spanning spacetile comprises:
performing a spacetile punch process for the region of interest to generate a plurality of spacetiles;
identifying a first set of one or more local, maximally spanning spacetiles; and
identifying the local, maximally spanning spacetile from the one or more local, maximally spanning spacetiles.

3. The computer implemented method of claim 2, the act of performing the spacetile punch process comprising:
identifying at least a first layer and a second layer in the electronic design that are related to the first circuit feature;
identifying or determining a spacetile canvas by aggregating a first plurality of spacetiles for the first layer with a second plurality of spacetiles for the second layer; and
determining the plurality of spacetiles based at least in part upon a result of aggregating the first plurality of spacetiles for the first layer with a second plurality of spacetiles for the second layer.

4. The computer implemented method of claim 2, the act of determining or identifying the local, maximally spanning spacetile further comprising:
discarding at least one spacetile from the plurality of spacetiles to form a set of one or more remaining spacetiles.

5. The computer implemented method of claim 4, the process further comprising:
performing one or both of a spacetile merging process and a spacetile partitioning process on at least a part of the set of one or more remaining spacetiles, wherein
the spacetile merging process combines two or more spacetiles into a first single spacetile, and
the spacetile partitioning process sub-divides a second single spacetile into multiple, smaller spacetiles.

6. The computer implemented method of claim 2, the process further comprising:
ordering or prioritizing the one or more local, maximally spanning spacetiles.

7. The computer implemented method of claim 6, in which the act of ordering or prioritizing the one or more local, maximally spanning spacetiles is based at least in part upon proximity of the one or more local, maximally spanning spacetiles to an aggressor circuit feature.

8. The computer implemented method of claim 6, in which the act of ordering or prioritizing the one or more local, maximally spanning spacetiles is based at least in part upon proximity of the one or more local, maximally spanning spacetiles to a reference line or a reference point.

9. The computer implemented method of claim 1, further comprising:
identifying an operation on a second circuit feature as an aggressor circuit feature, wherein the operation comprises an addition or a modification of a second circuit feature in the electronic design; and
identifying one or more circuit features that are negatively affected by the operation on the second circuit feature as one or more victim circuit features, wherein
the one or more victim circuit features include the first circuit feature, and
the region of interest is identified based at least in part upon the one or more victim circuit features or the aggressor circuit feature.

10. The computer implemented method of claim 9, wherein the one or more requirements comprise a first requirement that allows no bends in the first circuit feature.

11. The computer implemented method of claim 9, wherein the region of interest comprises a dynamic region that changes with a performance of the operation or with a specific victim circuit feature that is being implemented by using the local, maximally spanning spacetile or another local, maximally spanning spacetile.

12. The computer implemented method of claim 1, the process further comprising:
implementing a third circuit feature by using at least the local, maximally spanning spacetile or another local, maximally spanning spacetile while satisfying the one or more requirements.

13. The computer implemented method of claim 12, the process further comprising:
revising the region of interest based at least upon the third circuit feature; and
determining whether the local, maximally spanning spacetile or the another local, maximally spanning spacetile is to be used to implement the third circuit feature.

14. The computer implemented method of claim 13, wherein the another local, maximally spanning spacetile is to be used to implement the third circuit feature, the process further comprising:
performing a spacetile punch process with respect to the region of interest that has been revised;
identifying a second set of one or more local, maximally spanning spacetiles from the spacetile punch process; and
identifying the another local, maximally spanning spacetile from the second set of one or more local, maximally spanning spacetiles.

15. The computer implemented method of claim 1, wherein the at least one processor or at least one processor core is further to:
identify an operation on a second circuit feature as an aggressor circuit feature, wherein the operation comprises an addition or a modification of a second circuit feature in the electronic design; and
identify one or more circuit features that are negatively affected by the operation on the second circuit feature as one or more victim circuit features, wherein
the one or more victim circuit features include the first circuit feature, and the region of interest is identified based at least in part upon the one or more victim circuit features or the aggressor circuit feature.

16. A system for implementing multi-layer local maximal spanning routing paths in an electronic design, comprising:
at least one processor or at least one processor core that is at least to:
determine a region of interest based at least in part upon one or more requirements and a first feature to be implemented in the region of interest, wherein
the one or more requirements includes a design constraint that at least one victim circuit feature in the electronic design needs to satisfy;
determine a local, maximally spanning spacetile for the region of interest; and
implement the first circuit feature by using at least the local, maximally spanning spacetile for adjusting the at least one victim circuit feature while satisfying the one or more requirements for the at least one victim circuit feature.

17. The system of claim 16, wherein the at least one processor or at least one processor core that is at least to determine or identify the local, maximally spanning spacetile is further to:
perform a spacetile punch process for the region of interest to generate a plurality of spacetiles; and
identify a first set of one or more local, maximally spanning spacetiles; and
identify the local, maximally spanning spacetile from the one or more local, maximally spanning spacetiles.

18. The system of claim 17, wherein the at least one processor or at least one processor core that is at least to determine or identify the local, maximally spanning spacetile is further to:
discard at least one spacetile from the plurality of spacetiles to form a set of one or more remaining spacetiles.

19. The system of claim 18, wherein the at least one processor or at least one processor core that is at least to determine or identify the local, maximally spanning spacetile is further to:
perform one or both of a spacetile merging process and a spacetile partitioning process on at least a part of the set of one or more remaining spacetiles, wherein
the spacetile merging process combines two or more spacetiles into a first single spacetile, and
the spacetile partitioning process sub-divides a second single spacetile into multiple, smaller spacetiles.

20. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing multi-layer local maximal spanning routing paths in an electronic design, the method comprising:
using at least one processor or at least one processor core to perform a process the process comprising:
determining a region of interest based at least in part upon one or more requirements and a first feature to be implemented in the region of interest, wherein the one or more requirements includes a design constraint that at least one victim circuit feature in the electronic design needs to satisfy;
determining a local, maximally spanning spacetile for the region of interest; and
implementing the first circuit feature by using at least the local, maximally spanning spacetile for adjusting the at least one victim circuit feature while satisfying the one or more requirements for the at least one victim circuit feature.

21. The article of manufacture of claim 20, wherein the act of determining or identifying the local, maximally spanning spacetile further comprises:
performing a spacetile punch process for the region of interest to generate a plurality of spacetiles; and
identifying a first set of one or more local, maximally spanning spacetiles; and
identifying the local, maximally spanning spacetile from the one or more local, maximally spanning spacetiles.

22. The article of manufacture of claim 21, wherein the act of determining or identifying the local, maximally spanning spacetile further comprising:
performing one or both of a spacetile merging process and a spacetile partitioning process on at least a part of the set of one or more remaining spacetiles, wherein
the spacetile merging process combines two or more spacetiles into a first single spacetile, and
the spacetile partitioning process sub-divides a second single spacetile into multiple, smaller spacetiles.

23. The article of manufacture of claim 20, wherein process further comprises:
identifying an operation on a second circuit feature as an aggressor circuit feature, wherein the operation comprises an addition or a modification of a second circuit feature in the electronic design; and
identifying one or more circuit features that are negatively affected by the operation on the second circuit feature as one or more victim circuit features, wherein
the one or more victim circuit features include the first circuit feature, and
the region of interest is identified based at least in part upon the one or more victim circuit features or the aggressor circuit feature.

* * * * *